United States Patent
Gersztenkorn

(10) Patent No.: US 11,360,229 B2
(45) Date of Patent: Jun. 14, 2022

(54) DETECTING STRUCTURAL AND STRATIGRAPHIC INFORMATION FROM SEISMIC DATA

(71) Applicant: Fairfield Industries Incorporated, Houston, TX (US)

(72) Inventor: Adam Gersztenkorn, Sugar Land, TX (US)

(73) Assignee: FAIRFIELD INDUSTRIES, INC., Houston, TX (US)

( * ) Notice: Subject to any disclaimer, the term of this patent is extended or adjusted under 35 U.S.C. 154(b) by 420 days.

(21) Appl. No.: 16/453,897

(22) Filed: Jun. 26, 2019

(65) Prior Publication Data

US 2019/0361137 A1    Nov. 28, 2019

Related U.S. Application Data

(63) Continuation of application No. 14/006,924, filed on Jun. 29, 2017, now abandoned, which is a
(Continued)

(51) Int. Cl.
*G01V 1/30* (2006.01)
*G01V 1/28* (2006.01)
*G01V 1/36* (2006.01)

(52) U.S. Cl.
CPC ............... *G01V 1/307* (2013.01); *G01V 1/28* (2013.01); *G01V 1/364* (2013.01); *G01V 2210/20* (2013.01); *G01V 2210/23* (2013.01); *G01V 2210/48* (2013.01); *G01V 2210/63* (2013.01); *G01V 2210/64* (2013.01); *G01V 2210/74* (2013.01)

(58) Field of Classification Search
CPC .......... G01V 1/307; G01V 1/28; G01V 1/364; G01V 2210/64; G01V 2210/48; G01V 2210/63; G01V 2210/74; G01V 2210/20; G01V 2210/23

See application file for complete search history.

(56) References Cited

U.S. PATENT DOCUMENTS 6,556,922 B2  4/2003  Anno
6,594,585 B1  7/2003  Gersztenkorn
(Continued)

FOREIGN PATENT DOCUMENTS

CN    101545984    9/2009

OTHER PUBLICATIONS

Gersztenkorn, "A new approach for detecting topographic and geologic information in seismic data," Geophysics, vol. 77, No. 2 (2012), pp. V81-V90.
(Continued)

*Primary Examiner* — Ian J Lobo
(74) *Attorney, Agent, or Firm* — Sage Patent Group

(57) ABSTRACT

The present disclosure relates to a method of processing seismic signals comprising: receiving a set of seismic signals, applying a wavelet transformation to the set of signals and generating transformed signals across a plurality of scales. Then for each scale determining coherence information indicative of the transformed signals and generating a comparison matrix comparing the transformed signals, then outputting seismic attribute information based on combined coherence information.

20 Claims, 23 Drawing Sheets a) grid          b) graph           c) adjacency matrix

Related U.S. Application Data continuation of application No. 15/638,341, filed on Jun. 29, 2017, now Pat. No. 10,371,843, which is a continuation of application No. 14/509,443, filed as application No. PCT/US2012/030392 on Mar. 23, 2012, now Pat. No. 9,715,027.

(60) Provisional application No. 61/467,865, filed on Mar. 25, 2011.

(56) References Cited

U.S. PATENT DOCUMENTS

| | | | |
|---|---|---|---|
| 8,538,702 B2 | 9/2013 | Neelamani et al. | |
| 9,008,972 B2 * | 4/2015 | Imhof | G06K 9/00536 702/13 |
| 9,715,027 B2 * | 7/2017 | Gersztenkorn | G01V 1/364 |
| 10,371,843 B2 * | 8/2019 | Gersztenkorn | G01V 1/28 |

OTHER PUBLICATIONS

International Preliminary Report on Patentability for International Application No. PCT/US2012/030392 dated Oct. 10, 2013 (6 pages).
International Search Report and Written Opinion for International Application No. PCT/US2012/030392 dated Jun. 12, 2012 (5 pages).
Non-Final Office Action on U.S. Appl. No. 15/638,341 dated Dec. 11, 2018.
Notice of Allowance on U.S. Appl. No. 15/638,341 dated Mar. 20, 2019.
US Notice of Allowance on U.S. Appl. No. 14/509,443 dated Mar. 22, 2017.
US Office Action on U.S. Appl. No. 14/509,443 dated Dec. 15, 2016.
Wang et al., "An algorithm Study on the Seismic Coheence Cube using Wavelet Transform", Chinese J. Geophysic., vol. 45, Issue 6, pp. 887-893.
Wang et al., "An Algorithm Study on the Seismic Coherence Cube Using Wavelet Transform", Chinese Journal of Geophysics, vol. 45, No. 6,pp. 887-893 (Year: 2002).

* cited by examiner

DETECTING STRUCTURAL AND STRATIGRAPHIC INFORMATION FROM SEISMIC DATA

CROSS REFERENCE TO RELATED APPLICATIONS

This application claims the benefit of priority as a continuation of U.S. patent application Ser. No. 15/638,341, filed Jun. 29, 2017 and titled "DETECTING STRUCTURAL AND STRATIGRAPHIC INFORMATION FROM SEISMIC DATA", which claims the benefit of priority as a continuation of U.S. patent application Ser. No. 14/509,443, filed Oct. 8, 2014 and titled "DETECTING STRUCTURAL AND STRATIGRAPHIC INFORMATION FROM SEISMIC DATA", which claims the benefit of priority as a continuation of U.S. patent application Ser. No. 14/006,924, filed Sep. 23, 2013 and titled "DETECTING STRUCTURAL AND STRATIGRAPHIC INFORMATION FROM SEISMIC DATA", which is a U.S. National Stage of PCT/US2012/030392 filed Mar. 23, 2012 and titled "DETECTING STRUCTURAL AND STRATIGRAPHIC INFORMATION FROM SEISMIC DATA", which claims the benefit of U.S. Provisional Application Ser. No. 61/467,865, titled DETECTING STRUCTURAL AND STRATIGRAPHIC INFORMATION FROM SEISMIC DATA, filed Mar. 25, 2011. The entire contents of the foregoing are incorporated herein by reference.

FIELD

Embodiments of the present invention relate to techniques for processing data such as seismic data.

BACKGROUND

Several coherence type algorithms and wavelet transform calculations have been developed separately over the years for the purpose of detecting and extracting information about structure and stratigraphy contained in 3D seismic data. However, the conventional coherence algorithms are suitable for fixed window calculations and are not amenable to analysis on multiple scales or frequencies (e.g. multiple windows). The deficiency in the conventional calculations thus restricts the amount of information that may be obtained from seismic data. Thus, detailed structural and stratigraphic information is not as effective as methods utilizing the current technology.

Several coherence type algorithms have been developed over the years for the purpose of detecting and extracting information about structure and stratigraphy contained in 3D seismic data. Separately from coherence, wavelet transforms have been developed and applied to seismic data for a number of reasons. It is believed that the two technologies have not been previously combined. Conventional coherence algorithms are suitable for fixed window calculations and are thus not amenable to facilitate analysis with multiple scales (e.g. multiple windows) best suited for different frequencies present in data. The deficiency in the conventional calculations thus restricts the type of information that may be obtained from seismic data. Thus, combined detailed structural and stratigraphic information is not as effective as utilizing the current technology.

SUMMARY

Embodiments described herein include methods utilized to derive additional structural and stratigraphic data from seismic data. In some embodiments, the method includes algorithms that are designed to extract more information from seismic data than conventional techniques. The algorithms may be applied to seismic data in either time or depth. One embodiment of the method provides utilizing one or more of the algorithms described herein to extract structural and stratigraphic data from seismic data. The structural and stratigraphic data may be output to any suitable medium for display or review, such as a computer monitor or a printer. In another embodiment, a computer readable medium for extracting structural and stratigraphic data from seismic data is provided.

In one aspect, a method is disclosed including: receiving (or obtaining, generating, etc.) a set of seismic signal traces corresponding to seismic volume; applying a wavelet transformation to the set of signal traces to generate transformed signals at each of a plurality scales; for each of the scales, determining scale dependent coherence information indicative of the coherence of the transformed signals at the respective scale; combining the scale dependent coherence information to generate combined information; and outputting seismic attribute information based on the combined information.

In some embodiments, the step of combining the scale dependent coherence information includes applying a scale dependent filter to the scale dependent coherence information.

In some embodiments, the step of determining scale dependent coherence information indicative of the coherence of the transformed signals at the respective scale includes: for each scale, generating a respective scale dependent covariance matrix based on the transformed signals at the respective scale.

In some embodiments, each scale k, the covariance matrix has the form:

$$C^k = \begin{bmatrix} B_{k1}^2 & B_{k1}B_{k2}\cos(\Delta\beta_{12}^k) & \cdots & B_{k1}B_{kM}\cos(\Delta\beta_{1M}^k) \\ B_{k2}B_{k1}\cos(\Delta\beta_{21}^k) & B_{k2}^2 & \cdots & B_{k2}B_{kM}\cos(\Delta\beta_{2M}^k) \\ \vdots & \vdots & \ddots & \vdots \\ B_{kM}B_{k1}\cos(\Delta\beta_{M1}^k) & B_{kM}B_{k2}\cos(\Delta\beta_{M2}^k) & \cdots & B_{kM}^2 \end{bmatrix} \quad (16)$$

where $B_{ki}$ is the amplitude of the transform of the $i^{th}$ trace at scale k, where M is the total number of traces at scale k; and where $\Delta\beta_{mn}^k$ is the difference between the phase of the transform of the $m^{th}$ trace at scale k and the phase of the transform of the $n^{th}$ trace at scale k.

In some embodiments, the step of generating combined coherence information includes generating a weighted sum of the scale dependent covariance matrices over the plurality of scales.

In some embodiments, the method steps are carried out on a computer.

Some embodiments include repeating the method steps over multiple sets of traces to generate one or more topographical images showing stratigraphic details of a portion of the earth.

Some embodiments include displaying the images.

Some embodiments include analyzing the images to determine the presence of hydrocarbon deposits.

In another aspect, a method is disclosed including: receiving a set of seismic signal traces corresponding to a seismic volume; applying a wavelet transformation to the set of signal traces to generate transformed signal traces at each of a plurality of scales; and for each of the scales, generating a comparison matrix comparing the transformed signal traces, and determining direction dependent comparison information based on an imaginary part of the comparison matrix; and outputting seismic attribute information based on the direction dependent comparison information.

In some embodiments, each entry in the comparison matrix corresponds to a comparison of a pair of the transformed signal traces.

In some embodiments, the step of determining direction dependent comparison information includes: applying a filter to the imaginary part of the comparison matrix to modify a directional property of the imaginary part of the comparison matrix.

In some embodiments, the filter includes an adjacency matrix corresponding to directed graph on a template of trace locations having nodes corresponding to the trace locations.

In some embodiments, the size of the template is scale dependent.

In some embodiments, the structure of the directed graph is scale dependent.

In some embodiments, non-zero elements in the adjacency matrix correspond to nodes in the graph connected by edges and the sign of the non-zero entries is indicative of the direction of interaction between the nodes.

In some embodiments, the directed graph is designed to preferentially allow interaction between nodes in preferred direction.

In some embodiments, traces in the template are arranged in a grid having an in-line direction and a cross-line direction, and the preferred directions correspond to an in-line direction for the array.

In some embodiments, traces in the template are arranged in a grid having an in-line direction and an cross-line direction, and the preferred directions corresponds to a cross-line direction for the array.

In some embodiments, traces in the template are arranged in a grid having an in-line direction and a cross-line direction, and the preferred direction corresponds to a range of angles relative to the in-line direction.

In some embodiments, applying an adjacency matrix to an imaginary part of the comparison matrix includes applying the adjacency matrix to the imaginary part of the of the comparison matrix using a Hadamard product.

In some embodiments, for each scale k, the comparison matrix has the form:

transform of the $m^{th}$ trace at scale k and the phase of the transform of the $n^{th}$ trace at scale k.

Some embodiments include determining a scale dependent geographical factor by: applying an adjacency matrix to the imaginary part of the comparison matrix and determining a scalar imaginary term value based on the result; determining a scalar real term value based on the real part of the comparison matrix; and determining a scale dependent scalar geographic value based on a weighted sum of the scalar real term value and the scalar imaginary value.

Some embodiments include determining a combined geographic factor based on a weighted sum of the scale dependent scalar geographic value over the plurality of scales.

In some embodiments, the method steps are carried out on a computer.

Some embodiments include repeating the method steps over multiple sets of traces to generate one or more topographical images showing stratigraphic details of a portion of the earth.

Some embodiments include displaying the images.

Some embodiments include analyzing the images to determine the presence of hydrocarbon deposits.

In another aspect, a seismic map created using the methods described above is disclosed.

In another aspect, a non-transitory computer readable medium is disclosed containing programming instruction for processing seismic data, where execution of the instructions by one or more processors causes the one or more processors to carry out the steps of any of the methods described above.

In another aspect, a system is disclosed including: at least one memory set of seismic signal traces corresponding to seismic volume; and one or more processors in communication with the at least one memory, and configured to implement the method of any one of claims 1-28 to process the set of seismic signal traces.

Various embodiments may include any of the elements described above, alone or in any suitable combination.

$$C^k = \begin{bmatrix} B_{k1}^2 & B_{k1}B_{k2}\cos(\Delta\beta_{12}^k) & \cdots & B_{k1}B_{kM}\cos(\Delta\beta_{1M}^k) \\ B_{k2}B_{k1}\cos(\Delta\beta_{21}^k) & B_{k2}^2 & \cdots & B_{k2}B_{kM}\cos(\Delta\beta_{2M}^k) \\ \vdots & \vdots & \ddots & \vdots \\ B_{kM}B_{k1}\cos(\Delta\beta_{M1}^k) & B_{kM}B_{k2}\cos(\Delta\beta_{M2}^k) & \cdots & B_{kM}^2 \end{bmatrix} +$$

$$i \begin{bmatrix} 0 & B_{k1}B_{k2}\sin(\Delta\beta_{12}^k) & \cdots & B_{k1}B_{kM}\sin(\Delta\beta_{1M}^k) \\ B_{k2}B_{k1}\sin(\Delta\beta_{21}^k) & 0 & \cdots & B_{k2}B_{kM}\sin(\Delta\beta_{2M}^k) \\ \vdots & \vdots & \ddots & \vdots \\ B_{kM}B_{k1}\sin(\Delta\beta_{M1}^k) & B_{kM}B_{k2}\sin(\Delta\beta_{M2}^k) & \cdots & 0 \end{bmatrix}$$

Figure 4:
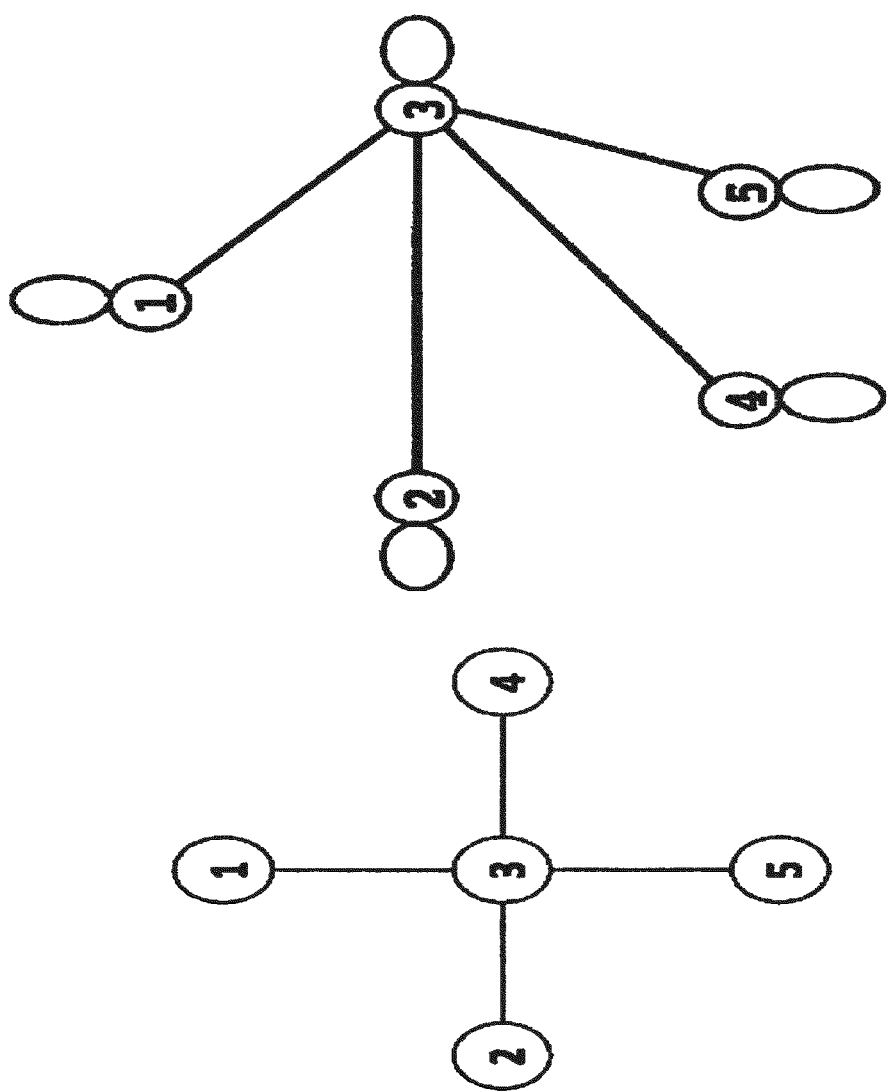

(18)

where $B_{ki}$ is the amplitude of the transform of the $i^{th}$ trace at scale k, where M is the total number of traces at scale k; and where $\Delta\beta_{mn}^k$ is the difference between the phase of the FIG. 4 shows corresponding grid (panel a), graph (panel b) and adjacency matrix (panel c) for 5-point template with restricted communication.

Figure 5:
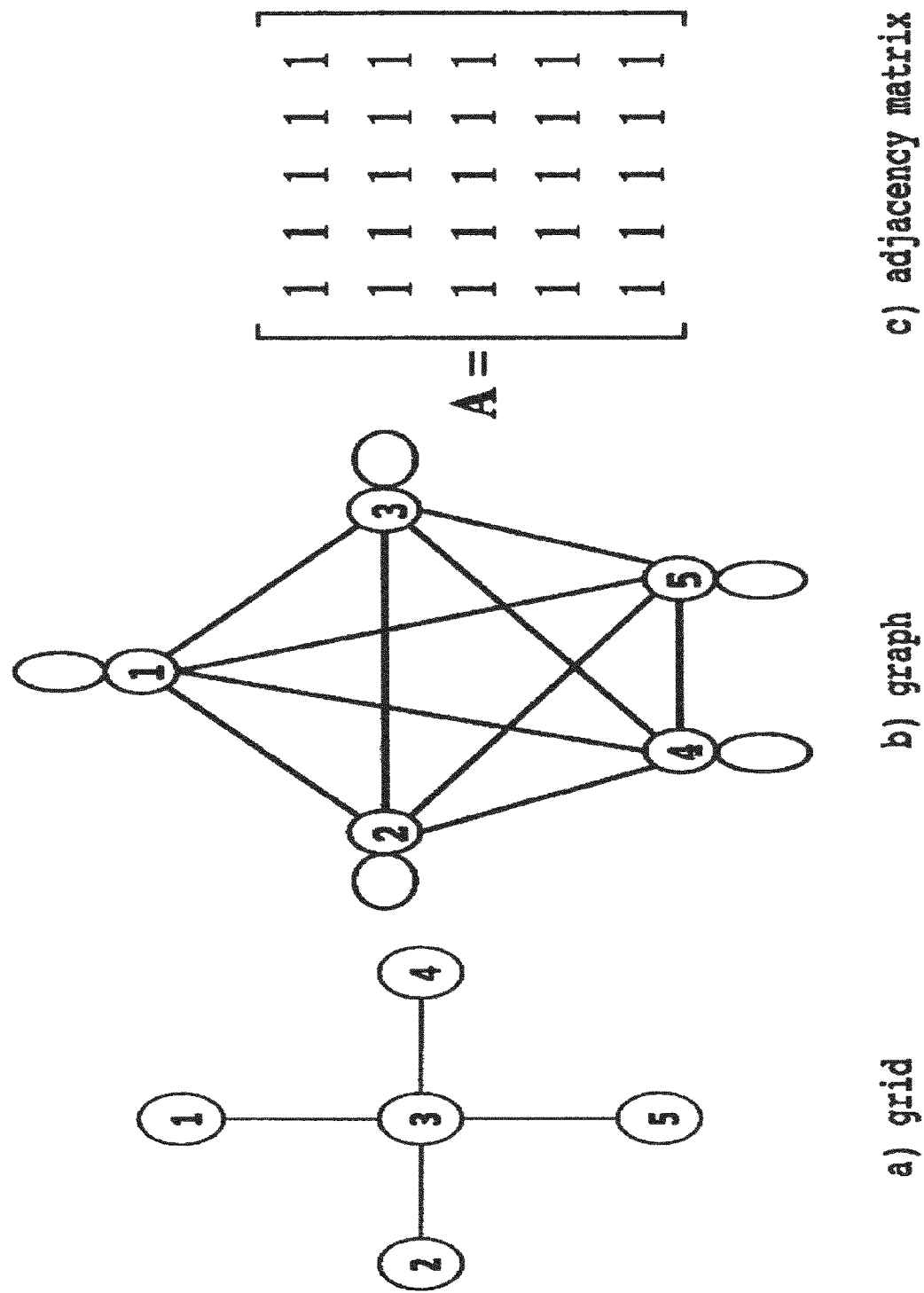

FIG. 5 shows corresponding grid (panel a), graph (panel b) and adjacency matrix (panel c) for 5-point template with full communication.

Figure 6:
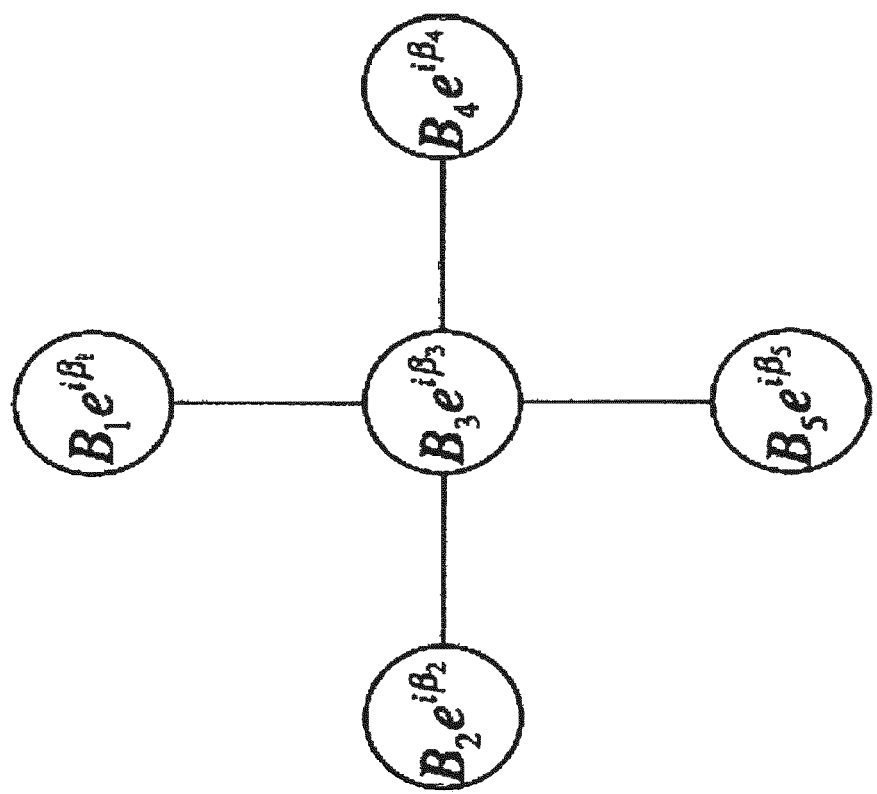

FIG. 6 is an illustration of grid amplitudes and phases for a 5-point template.

Figure 7:
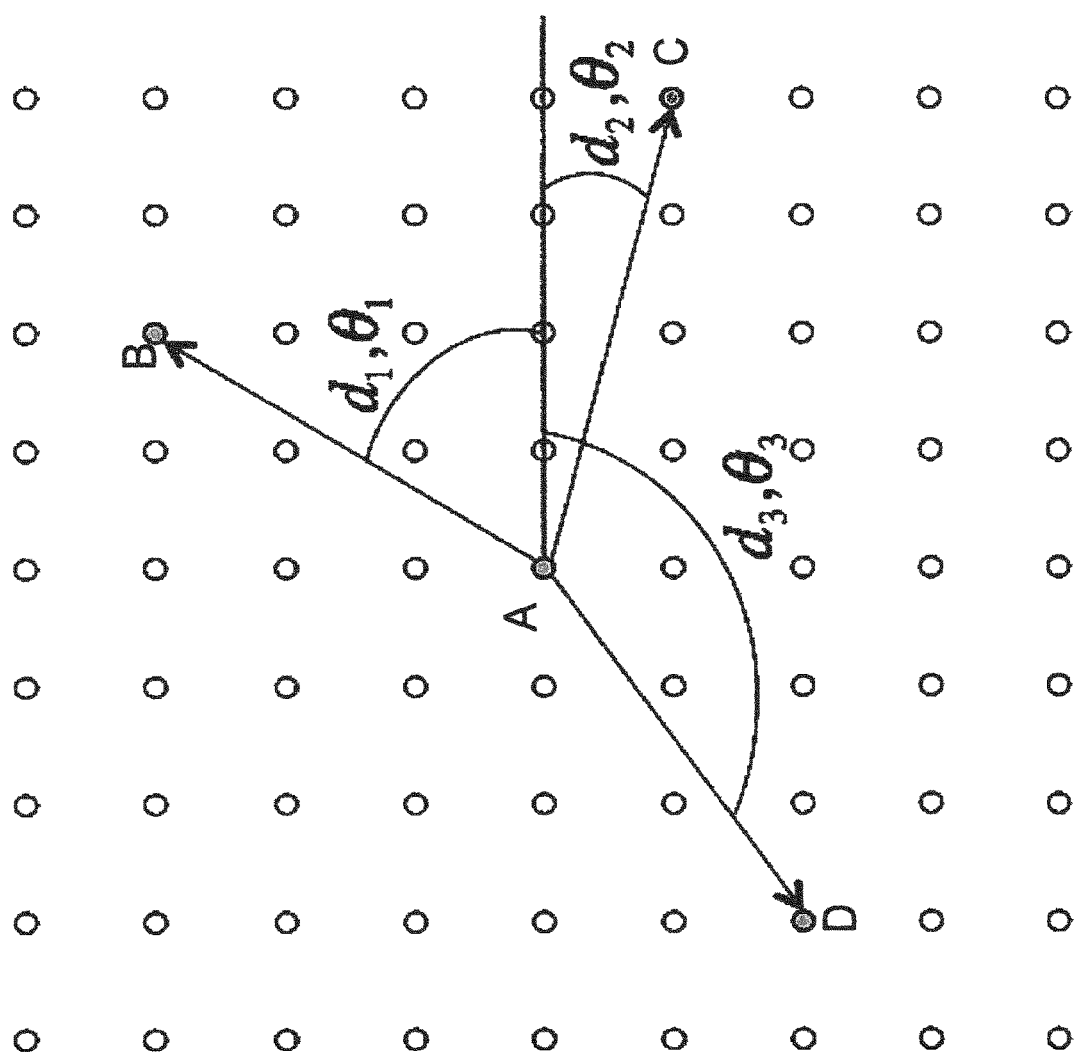

FIG. 7 is a schematic illustrating distances and angles defined from grid point A (i.e. a central trace location) to three other grid points B, C and D (i.e. other race locations).

Figure 8:
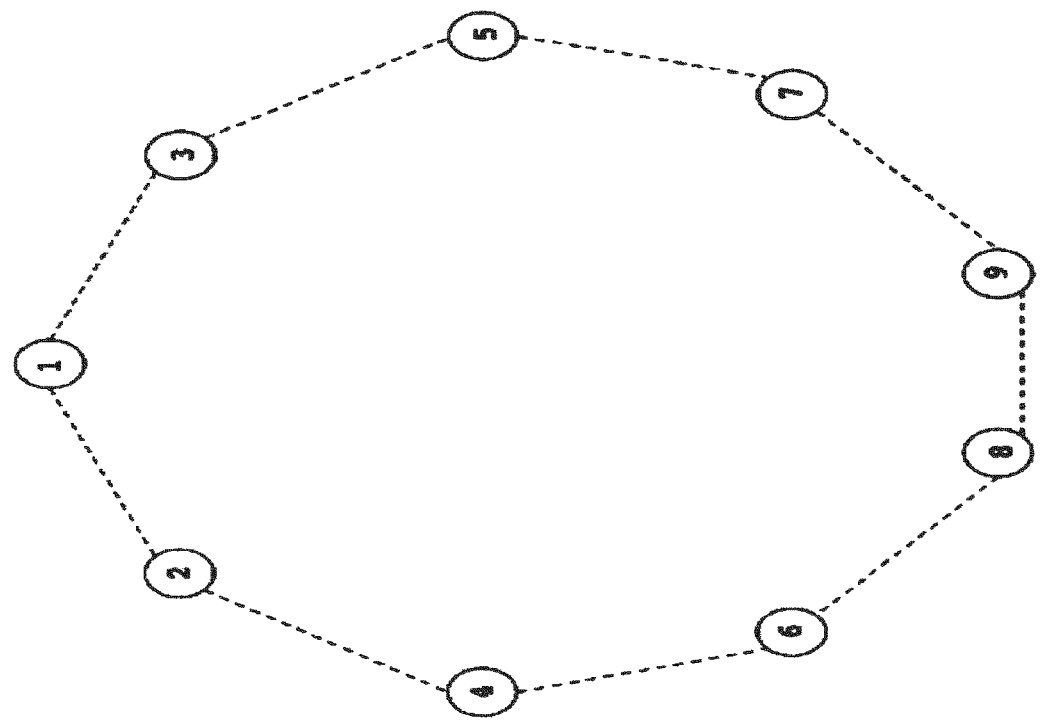
Figure 8:
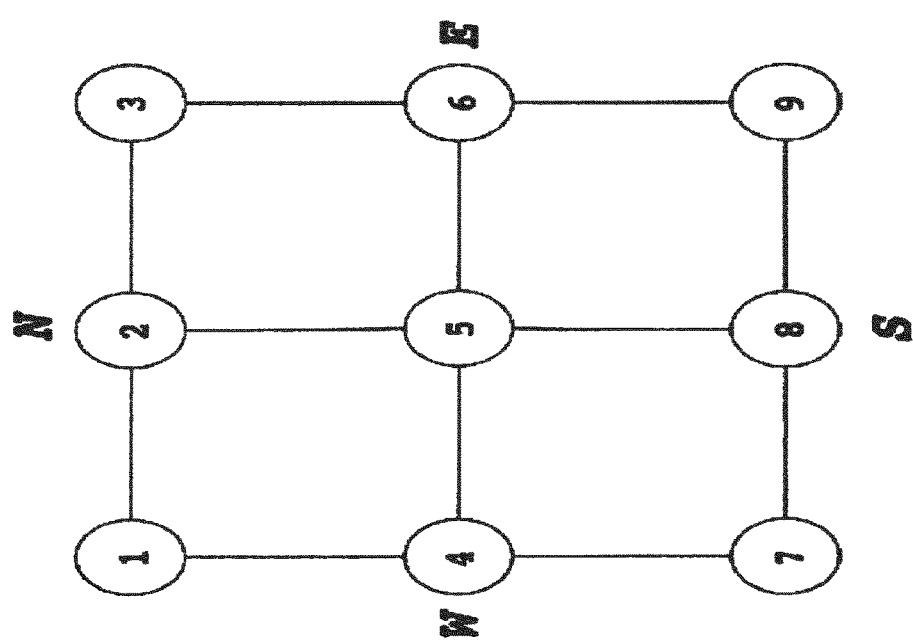

FIG. 8 shows a template (panel a) and associated 9-point polygon (i.e. a nonagon) (panel b).

Figure 9:
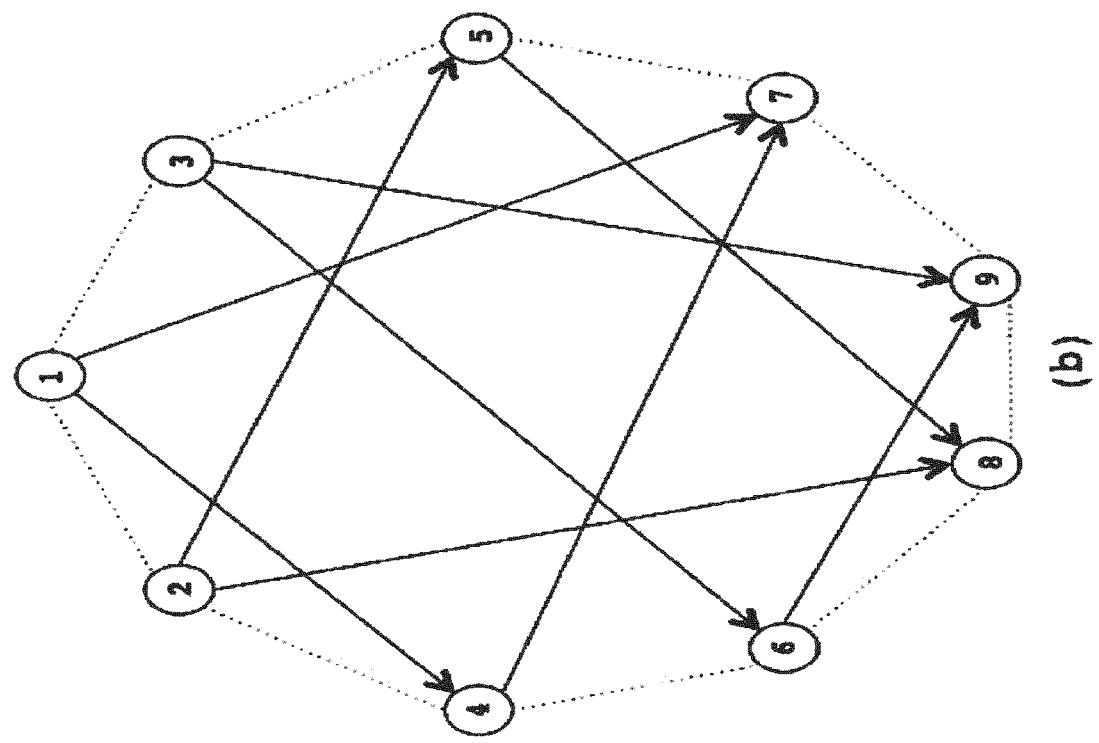
Figure 9:
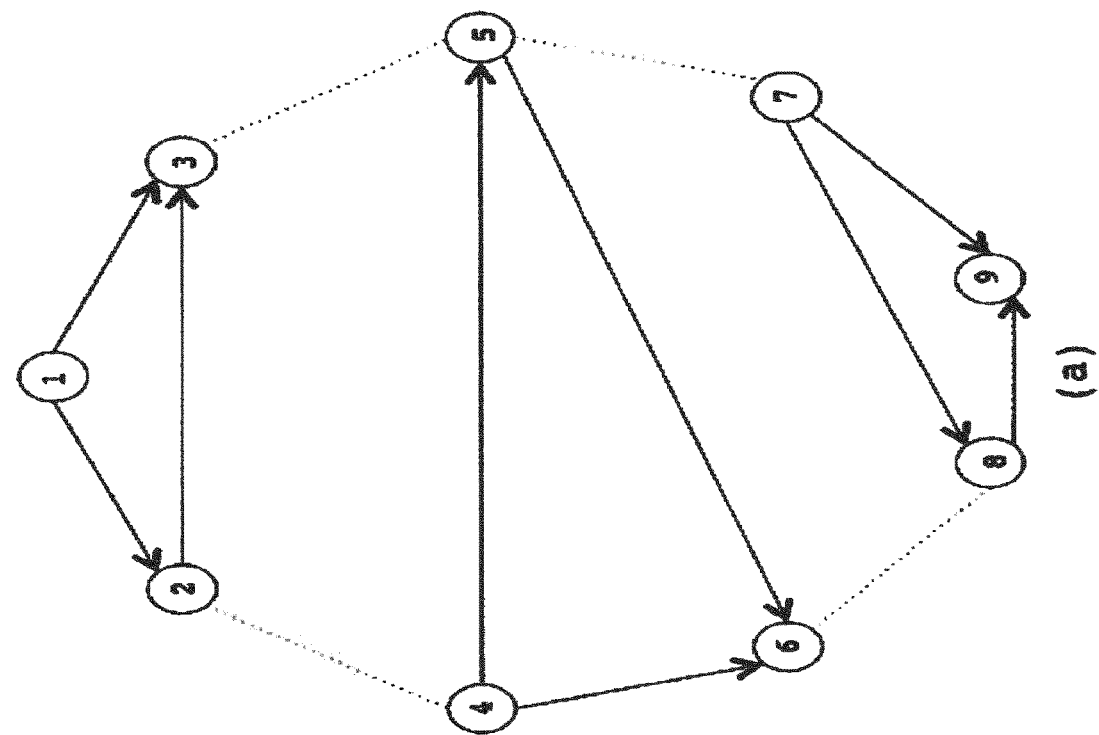

FIG. 9 shows directed graphs for a 9-point template with communication proceeding from West to East (panel a) and from North to South (panel b).

Figure 10:
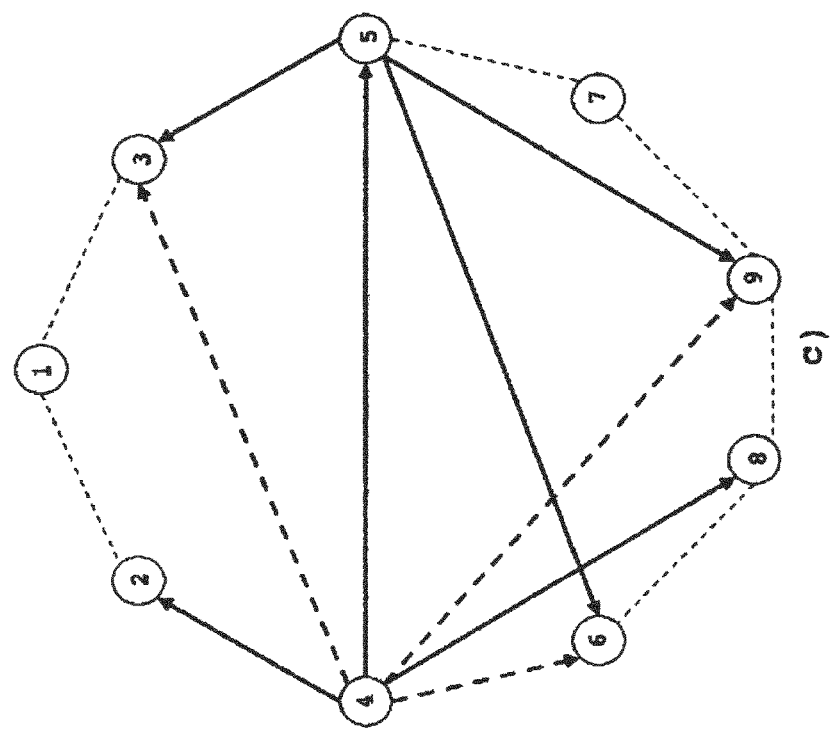
Figure 10:
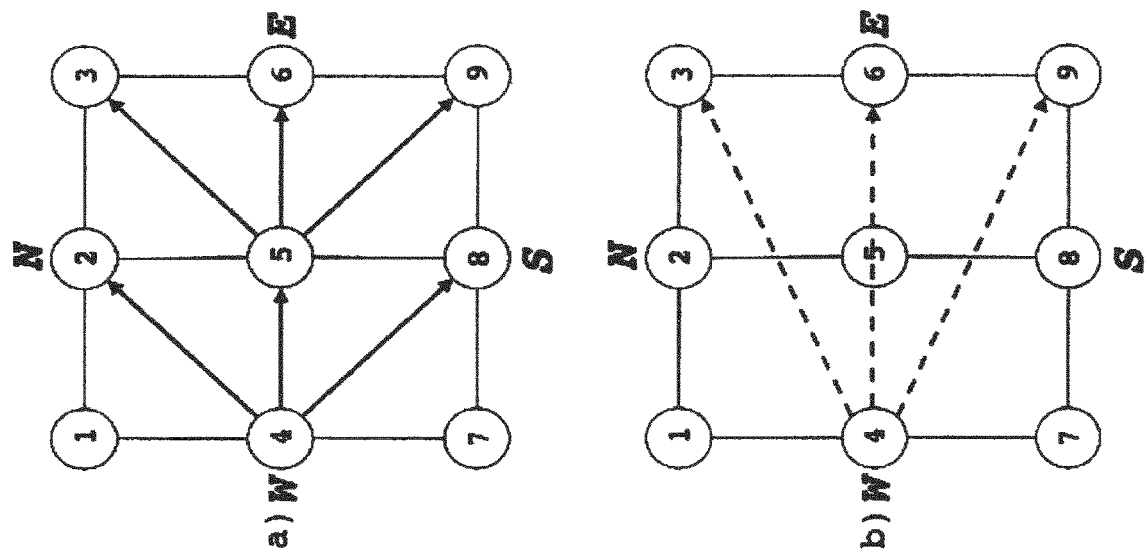

FIG. 10 shows a finer scale grid communication (panel a) and coarser scale communication (panel b) and a graph representing all communication (panel c). Solid arrows indicate fine scale communication, dashed arrows indicate coarse scale communication.

FIGS. 11-17 are images from a display that illustrate topographical slices from a seismic survey array that were developed utilizing embodiments described herein. The topographical images also show stratigraphic details such as depth of the features. The numbering on the x and y axes represent seismic trace locations. Each of the figures depicts an area of about 46 miles by 46 miles at various depths below a surface of the earth (these images are below the sea floor). The surface may be a land surface or a bottom surface of a body of water, such as the seafloor of the Gulf of Mexico.

Figure 11:
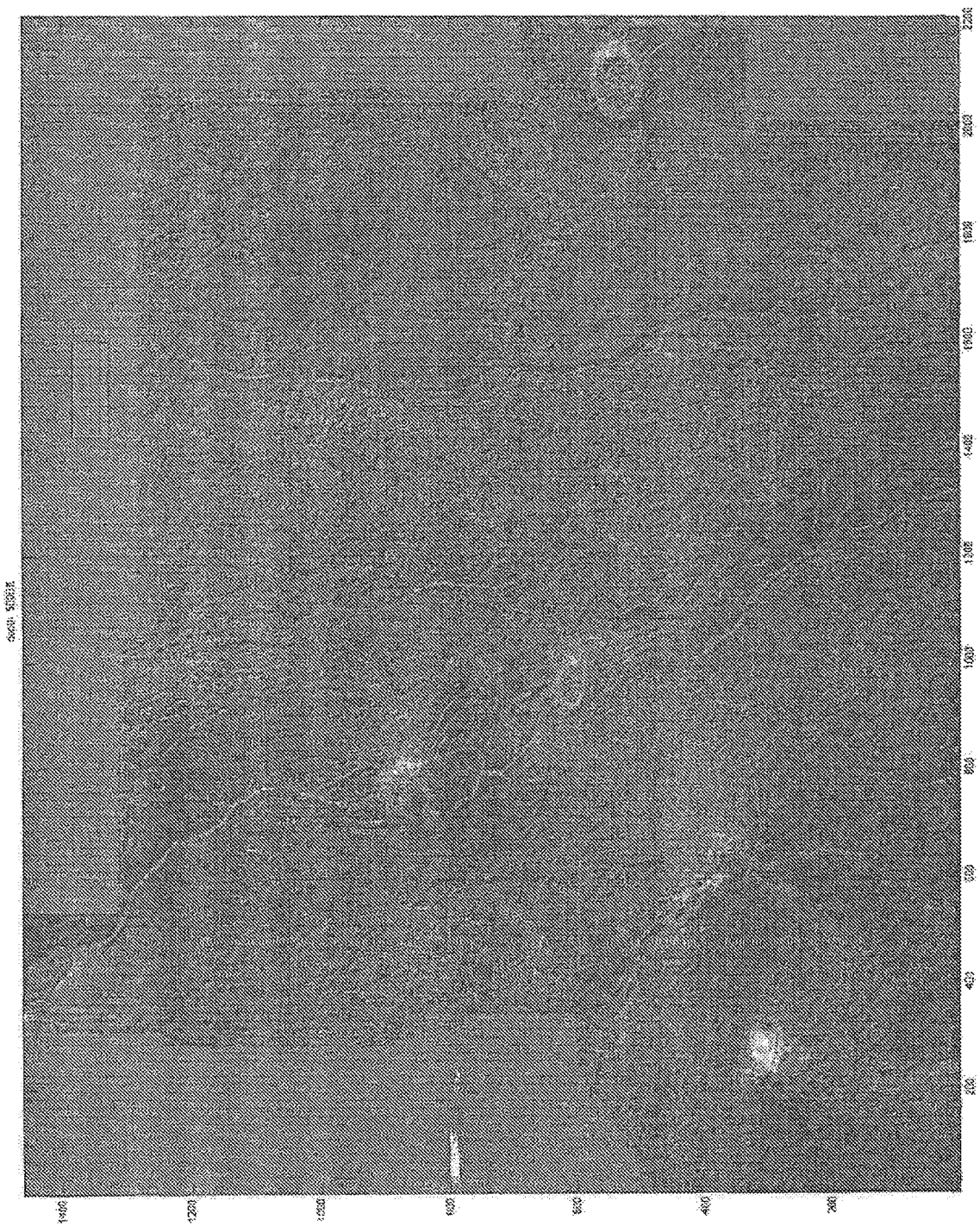

FIG. 11 is a topographical image of the area at a depth of 5000 feet below the surface using the sine matrix (imaginary matrix).

Figure 12:
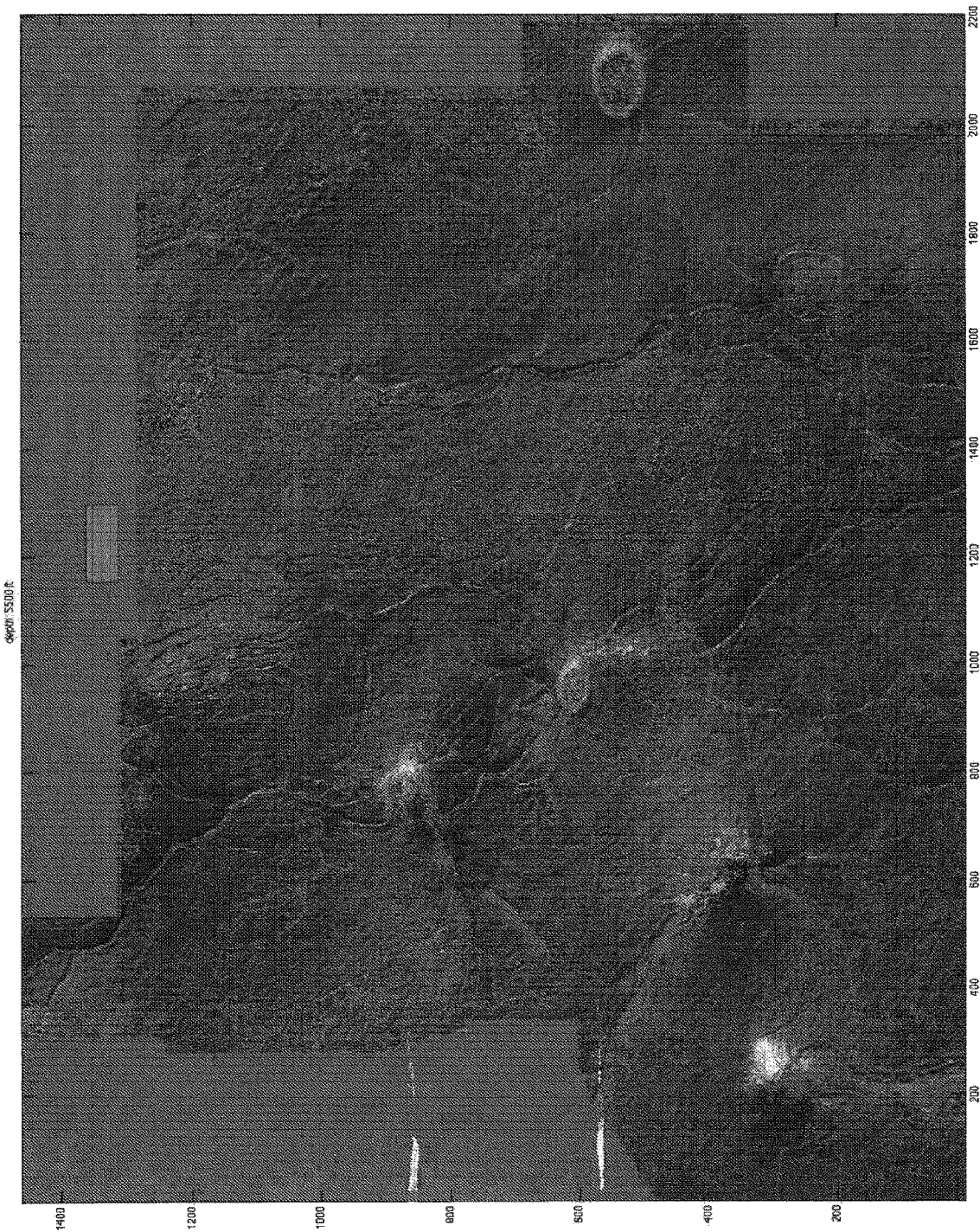

FIG. 12 is a topographical image of the area at a depth of 5500 feet below the surface using the sine matrix (imaginary matrix).

Figure 13:

FIG. 13 is a topographical image of the area at a depth of 6000 feet below the surface using the sine matrix (imaginary matrix).

Figure 14:
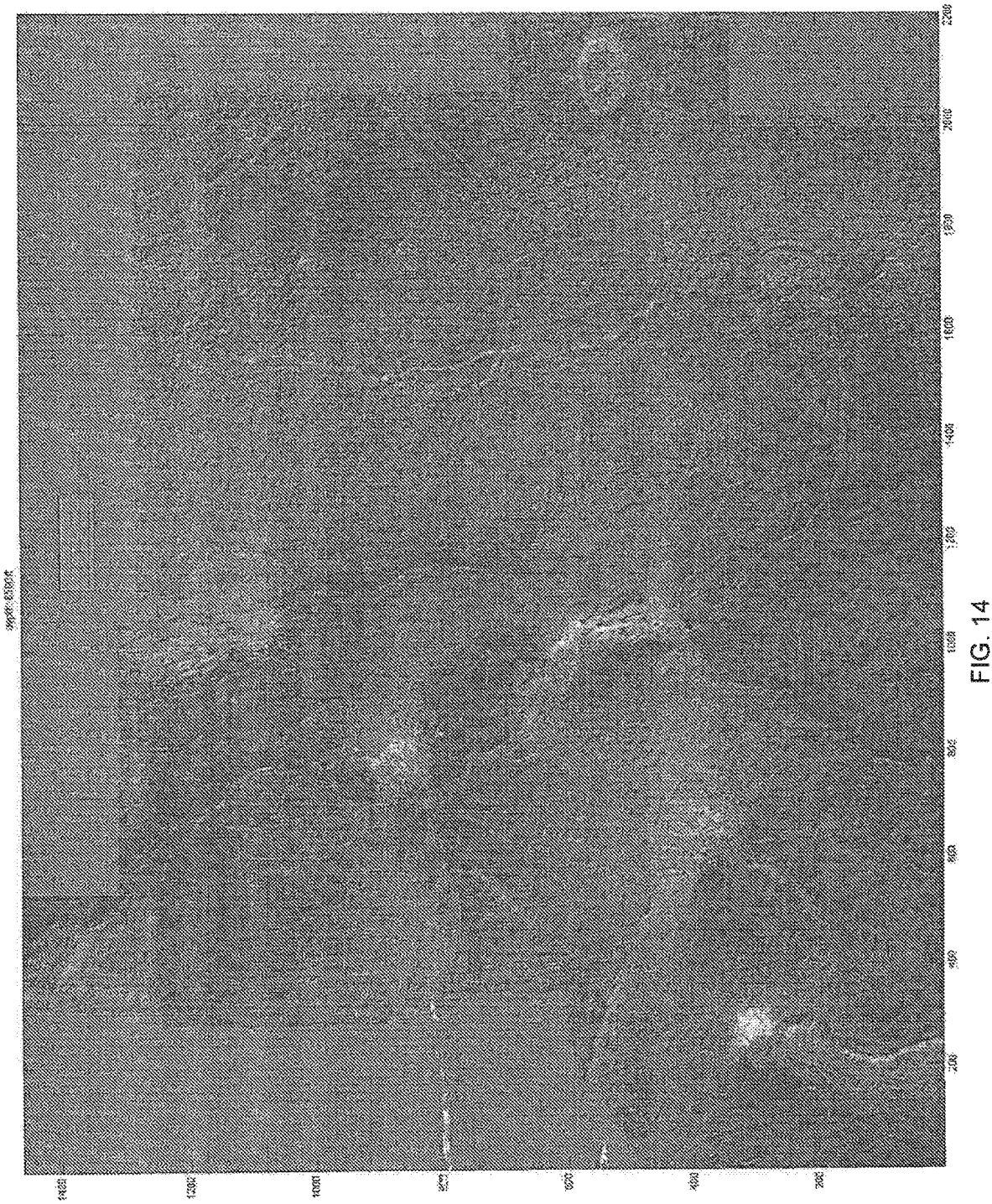

FIG. 14 is a topographical image of the area at a depth of 6500 feet below the surface using the sine matrix (imaginary matrix).

Figure 15:
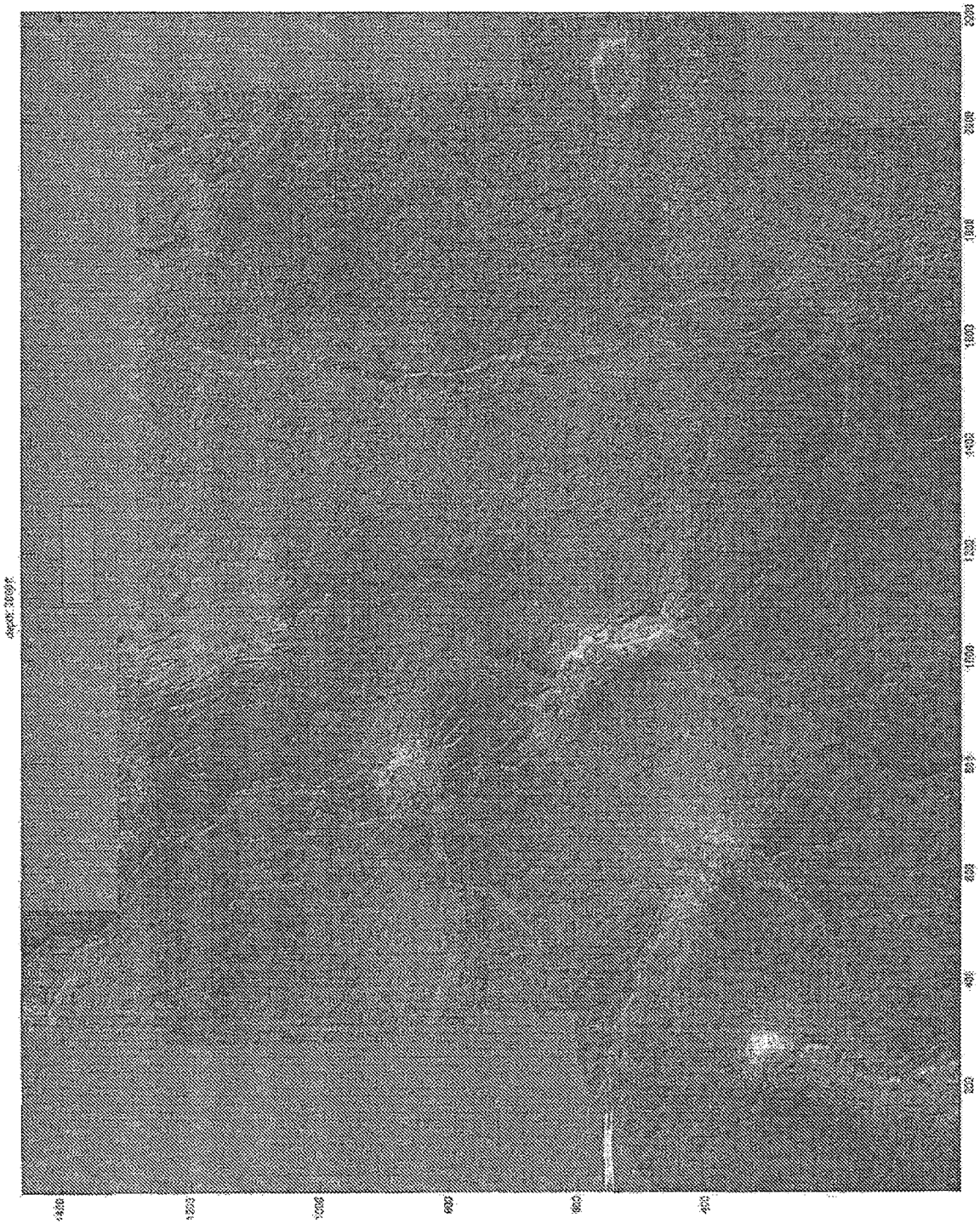

FIG. 15 is a topographical image of the area at a depth of 7000 feet below the surface using the sine matrix (imaginary matrix).

Figure 16:
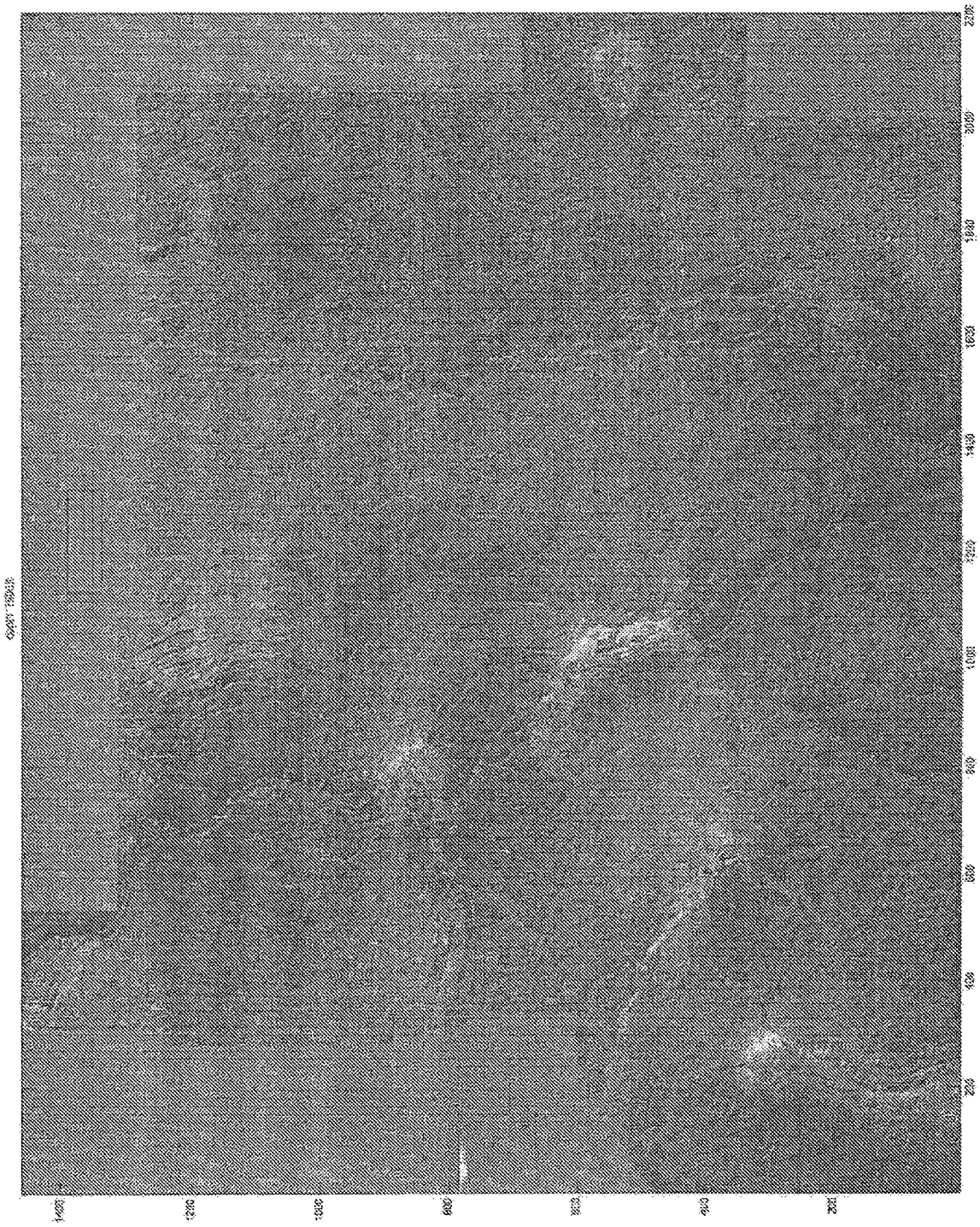

FIG. 16 is a topographical image of the area at a depth of 7500 feet below the surface using the sine matrix (imaginary matrix).

Figure 17:

FIG. 17 is a topographical image of the area at a depth of 8000 feet below the surface using the sine matrix (imaginary matrix).

FIGS. 18-23 are images from a display that illustrate various ways to manipulate seismic data according to embodiments described herein. The topographical images show stratigraphic details such as depth (they don't give actual depth but rather an idea of the topography in the sub-surface) of the features discernable by shadows. The numbering on the x and y axes represent seismic trace locations (indices and not actual physical trace locations). Each of the FIGS. 18-23 depict an area of about 46 miles by 46 miles at about 9000 feet below a surface of the earth (depths range from 5500 to 9000 ft below the sea floor).

Figure 18:
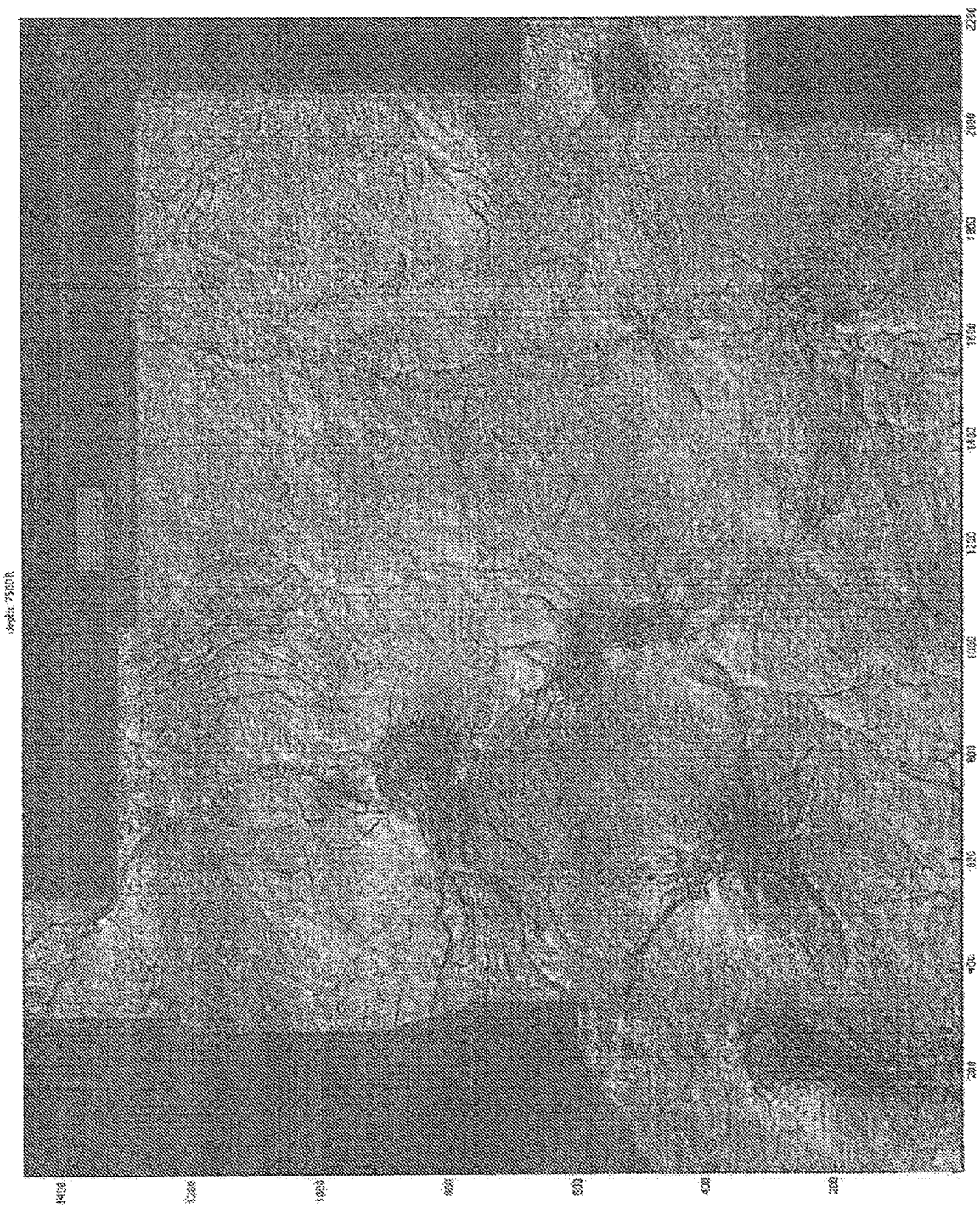

FIG. 18 is another topographical image of the area at a depth of 7500 feet below the surface using the sum of cosine matrix+sine matrix (real+imaginary matrices).

Figure 19:
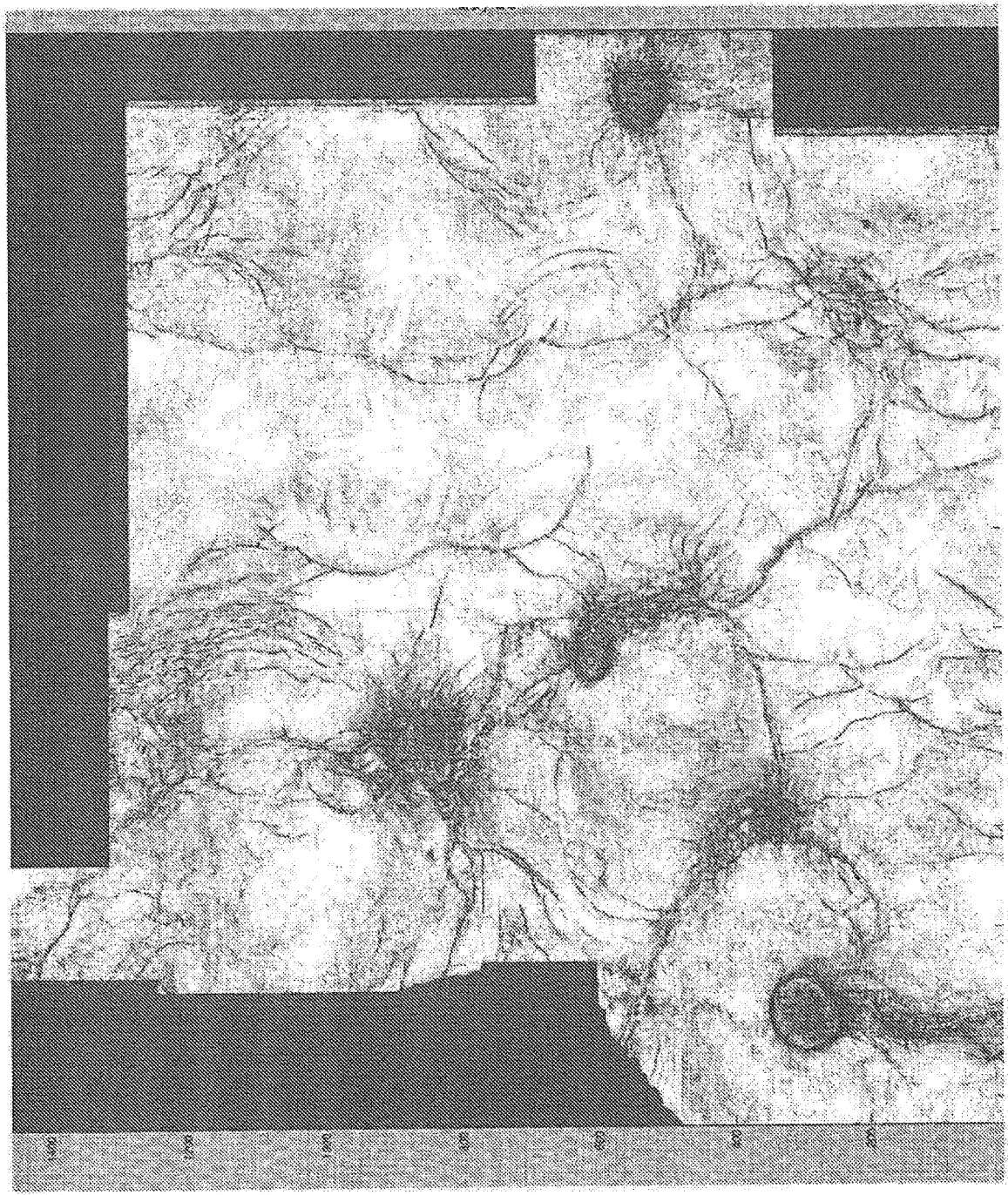

FIG. 19 is a topographical image of the area illustrating a cosine matrix (real matrix).

Figure 20:
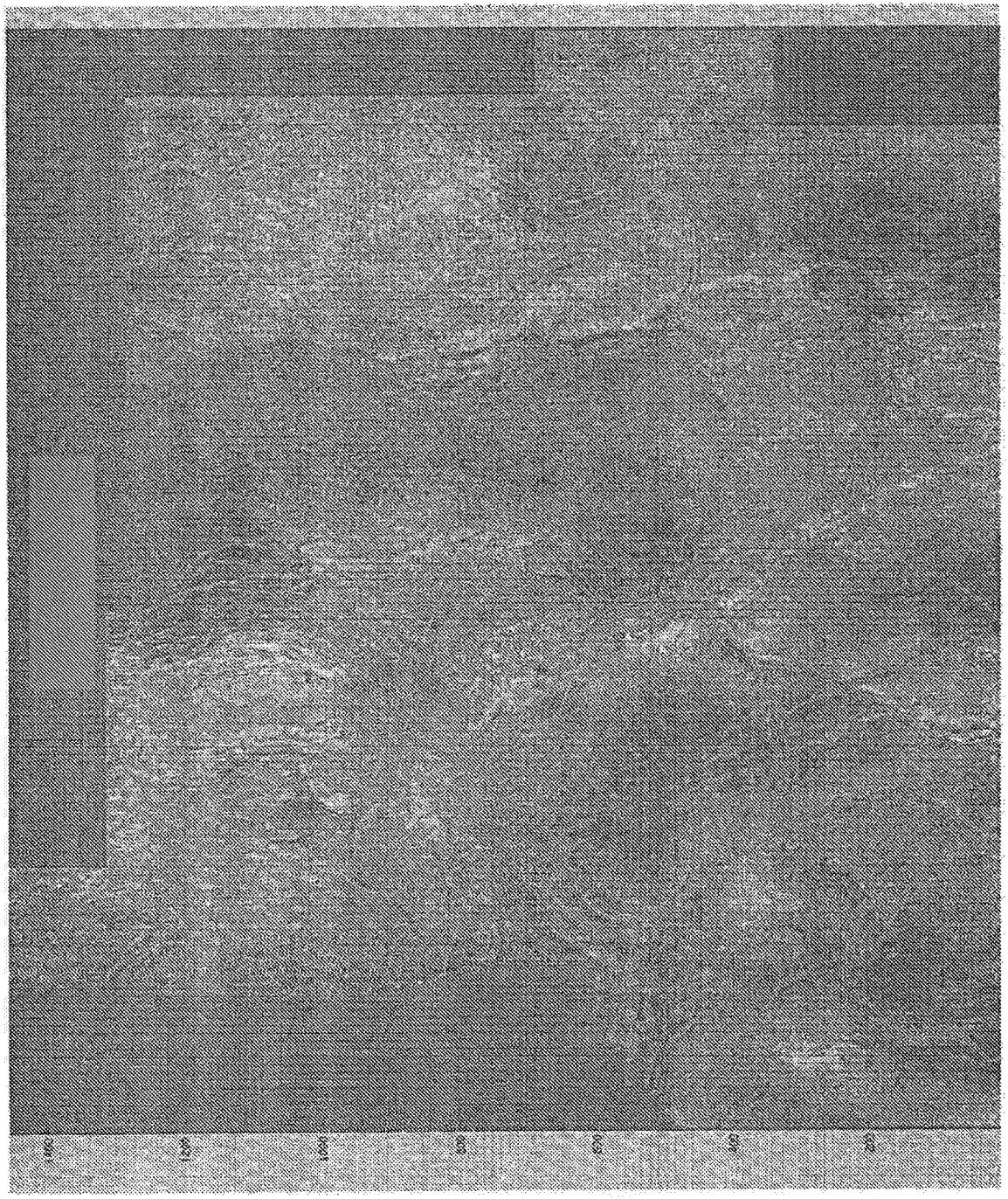

FIG. 20 is a topographical image of the area illustrating a sine matrix (imaginary matrix) with a larger template.

Figure 21:
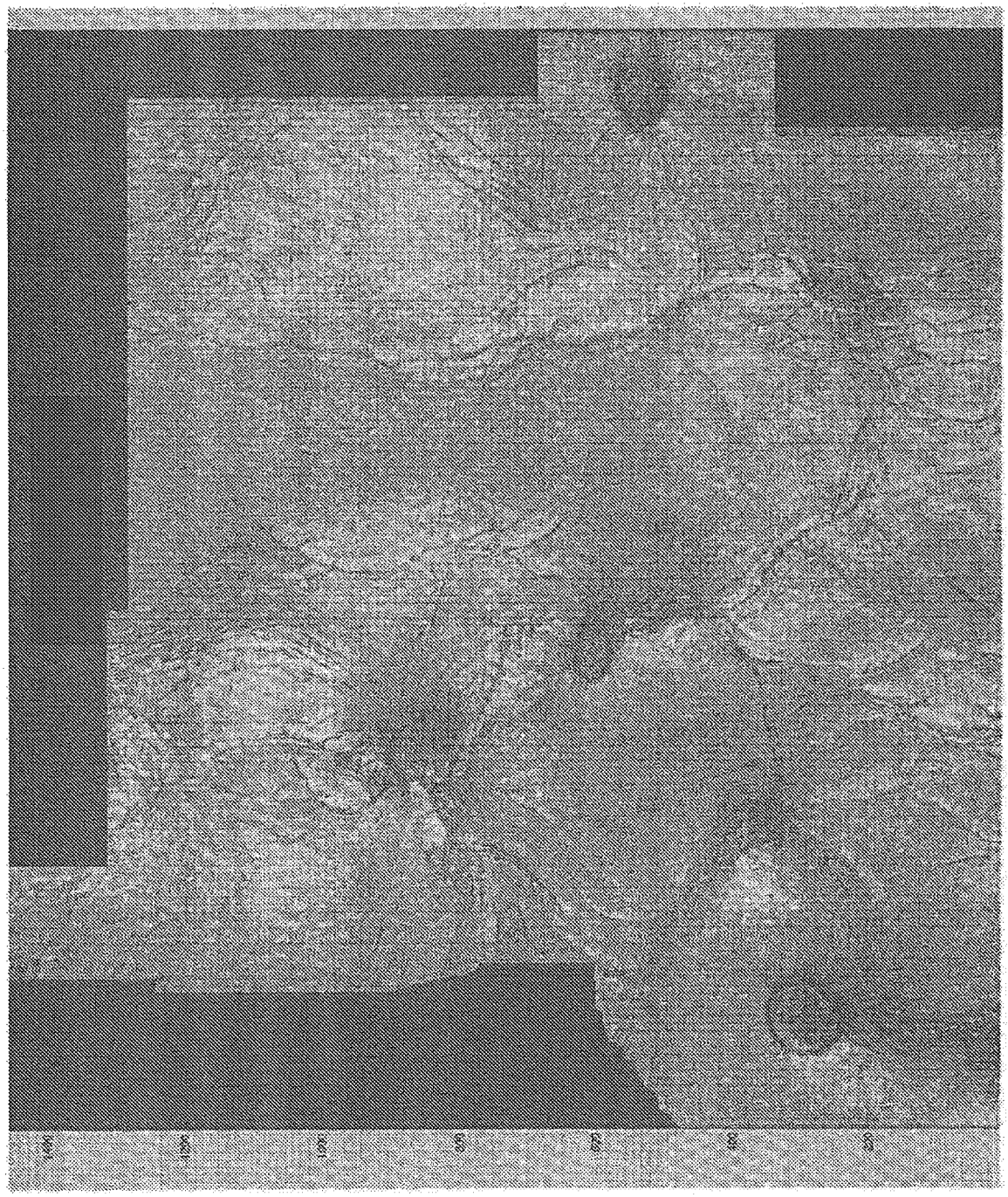

FIG. 21 is a topographical image of the area illustrating the cosine matrix of FIG. 19 plus the sine matrix (North-South illumination) of FIG. 20 (i.e. cosine matrix+sine matrix).

Figure 22:
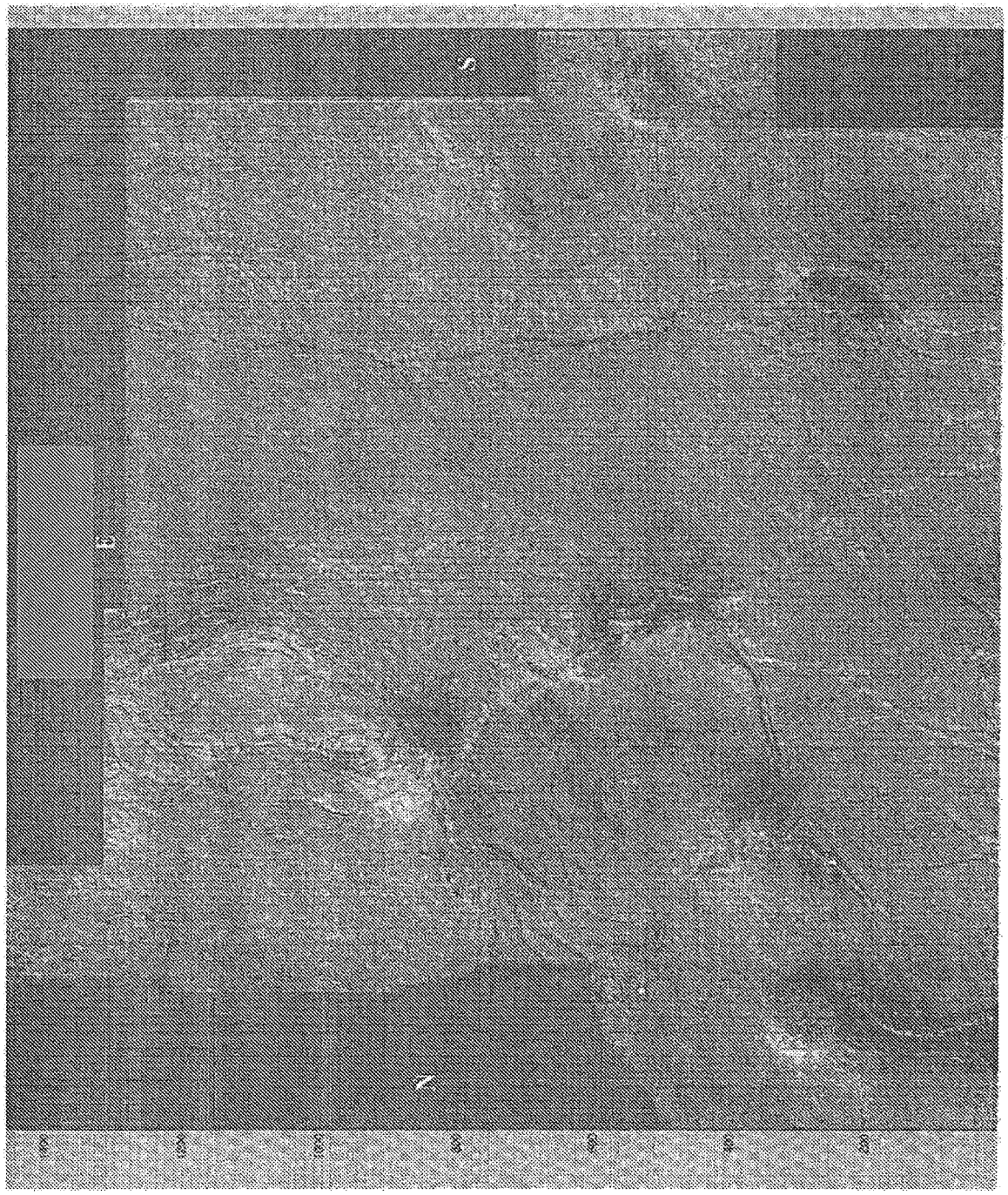

FIG. 22 is a topographical image of the area illustrating a sine matrix for North-South illumination with a smaller template.

Figure 23:
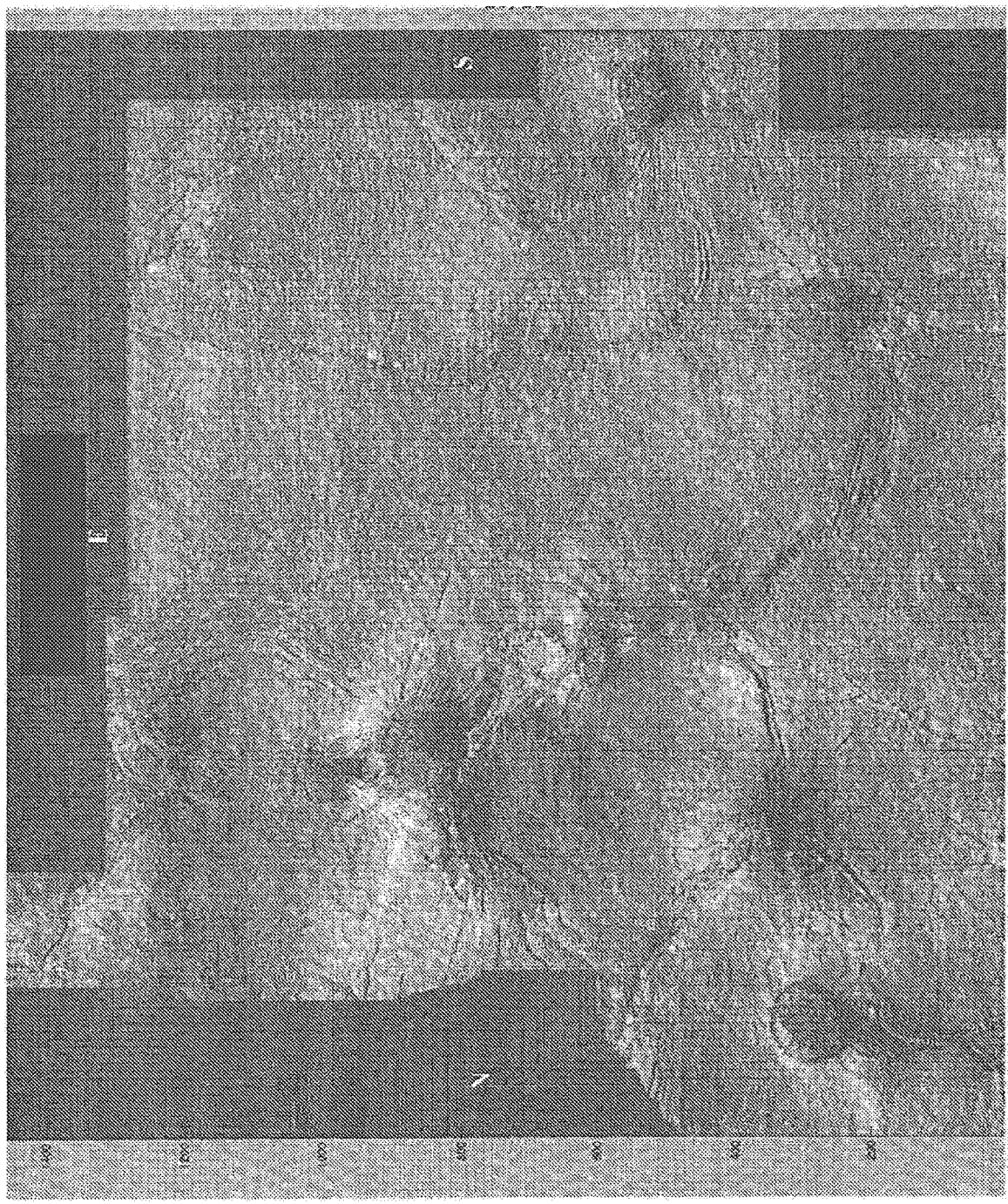

FIG. 23 is a topographical image of the area illustrating the cosine matrix of FIG. 19 plus the sine matrix (East-West illumination) of FIG. 22 (i.e. cosine matrix+sine matrix).

DETAILED DESCRIPTION

Embodiments of the method will be described in reference to a 3D seismic survey that extends in the two spatial directions x and y with the third direction being time t or depth z. Since time and depth are treated similarly it is convenient for the present to assume that the third direction is time with frequency being the transformed domain after application of a Fourier Transform. The concepts equally apply if the third domain is depth and wave number after application of a Fourier Transform. The initial seismic data utilized in the method may be pre-processed prior to performing the method as described herein. For example, noise may have been removed from the data by various filtering methods. The initial seismic data may have undergone various analyses, such as post-stack migration, pre-stack migration and/or interpolation (pre-stack processing, post-stack processing, interpolation and seismic migration). In one embodiment, the initial seismic data utilized in the method may be referred to as migrated seismic data.

A 3D seismic survey can form a volume with millions or billions of traces. The algorithms described herein may be utilized with a small analysis volume that moves throughout the seismic volume from point to point. During application of the algorithms, this analysis volume progresses through the seismic volume and produces an output volume equal in size to the input seismic volume. The analysis volume is usually much smaller than the seismic volume and could range in size from two traces to several hundred traces depending on the application. For example, an analysis volume could have dimensions of 3 by 3 by 100 in the x, y and t directions. This analysis volume would then move in all three directions as it analyzes the entire seismic volume.

The following description focuses on calculations applied to seismic data contained in the small analysis volume. This procedure is repeatedly applied from point to point until the entire volume has been processed. The specific calculations applied to the analysis volumes describe the various algorithms.

Previous coherence algorithms may be described by representing the traces in the analysis volume as a matrix. Each column represents a portion of one trace with a predetermined number of samples determined by a window length. So for example, an analysis volume with 100 samples and 3 traces in both x and y spatial directions (i.e., nt×nx×ny=100×3×3) would result in a matrix having 100 rows and 9 columns or a 100×9 matrix as described by eq. (1). Matrix A defines the analysis volume of M samples and N traces for which coherence is calculated. The entry in row n column m represents the trace value of the $n^{th}$ sample and $m^{th}$ trace.

$$A = \begin{bmatrix} a_{11} & a_{12} & \cdots & a_{1M} \\ a_{21} & a_{22} & \cdots & a_{2M} \\ \vdots & \vdots & \ddots & \vdots \\ a_{N1} & a_{N2} & \cdots & a_{NM} \end{bmatrix} \quad (1)$$

Two different measures of coherence will be briefly revisited here. These are semblance and eigenstructure.

Assuming the traces have been adjusted to be zero mean, the covariance matrix for the ensemble in Eq. (1) is given by $$C = A^T A = [c_{ij}], \quad i,j = 1, 2, \ldots, M \quad (2)$$

where the superscript T denotes the transpose of a matrix. The matrix C is an M×M, positive definite matrix (or positive semi-definite if the matrix is not full rank). Entry $c_{ij}$ in matrix C is the result of the inner product between column i and column j from matrix A. The sum of the elements along the diagonal of matrix C is equivalent to the energy in the analysis volume and is also the sum of the eigenvalues of the matrix A. The total energy in the analysis volume is given by, $$\text{Trace}(C) = \sum_{i=1}^{M} c_{ii} = \sum_{i=1}^{M} \lambda_i \quad (3)$$

In eq. (3) Trace(C) refers to the trace of a matrix and not a seismic trace. The semblance coherence for this analysis volume may be expressed in terms of the matrix C as $$S_c = \sum_{i=1}^{M} \sum_{j=1}^{M} c_{ij} / [M \times \text{Trace}(C)] \quad (4)$$

The eigenstructure coherence for this same analysis volume is defined as $$E_c = \lambda_{max} / \text{Trace}(C) = \lambda_{max} \Big/ \sum_{i=1}^{M} \lambda_i \quad (5)$$

In eq. (5) $\lambda_i$, $i = 1, 2, \ldots, M$ are the eigenvalues of the matrix C. The dominant eigenvalue $\lambda_{max}$ represents the energy for the dominant feature in the analysis volume. If all the traces in the analysis volume are identical then the energy for the dominant feature is equivalent to the total energy, resulting in a coherence value of 1 (since $\lambda_{max} = \lambda_1$, and $\lambda_i = 0$, for $i = 2, 3, \ldots, N$). It is worth noting that both $S_c$ and $E_c$ which have been previously discussed in the literature are calculated in the time domain.

Frequency Domain Coherence

Both the semblance and eigenstructure measures of coherence may be computed in the frequency domain. This has some advantages when it is desired to apply band pass and other frequency type filters. By applying a Short Time Fourier Transform (STFT) to each trace in the analysis volume a frequency domain representation of the analysis volume is obtained. Suppose a window of N samples is used for each trace in the analysis volume of M traces and the STFT is applied to each trace resulting in K frequencies. The $m^{th}$ trace, which is a column vector, would be handled in the following manner.

$$\begin{bmatrix} a_{1m} \\ a_{2m} \\ \vdots \\ a_{Nm} \end{bmatrix} STFT \Rightarrow \begin{bmatrix} A_{1m} e^{i\alpha_{1m}} \\ A_{2m} e^{i\alpha_{2m}} \\ \vdots \\ A_{Km} e^{i\alpha_{Km}} \end{bmatrix}, \quad m = 1, 2, \ldots, M \quad (6)$$

In Eq. (6), $A_{km}$ is the amplitude and $\alpha_{km}$ is the phase for frequency k of trace m. The frequency representation in this case forms a column vector. Extracting a single frequency k for all M traces and taking the outer product results in a single frequency covariance matrix. A single frequency k for all M traces has the following form.

$$U_k = [A_{k1} e^{i\alpha_{k1}} A_{k2} e^{i\alpha_{k2}} \ldots A_{kM} e^{i\alpha_{kM}}] \quad (7)$$

Taking the outer product of the row vector $U_k$ with itself, results in a covariance matrix for a single frequency and all M traces. This is defined in the following manner.

$$U_k^T \tilde{U}_k = \begin{bmatrix} A_{k1} e^{i\alpha_{k1}} \\ A_{k2} e^{i\alpha_{k2}} \\ \vdots \\ A_{kM} e^{i\alpha_{kM}} \end{bmatrix} [A_{k1} e^{-i\alpha_{k1}} \; A_{k2} e^{-i\alpha_{k2}} \; \cdots \; A_{kM} e^{-i\alpha_{kM}}] = \quad (8)$$

$$\begin{bmatrix} A_{k1}^2 & A_{k1} A_{k2} e^{i(\alpha_{k1} - \alpha_{k2})} & \cdots & A_{k1} A_{kM} e^{i(\alpha_{k1} - \alpha_{kM})} \\ A_{k2} A_{k1} e^{i(\alpha_{k2} - \alpha_{k1})} & A_{k2}^2 & \cdots & A_{k2} A_{kM} e^{i(\alpha_{k2} - \alpha_{kM})} \\ \vdots & \vdots & \ddots & \vdots \\ A_{kM} A_{k1} e^{i(\alpha_{kM} - \alpha_{k1})} & A_{kM} A_{k2} e^{i(\alpha_{kM} - \alpha_{k2})} & \cdots & A_{kM}^2 \end{bmatrix}$$

In equation (8), $\tilde{U}_k$ denotes the complex conjugate of $U_k$ and the product $U_k^T \tilde{U}_k$ is the frequency equivalent covariance matrix $C^k = U_k^T \tilde{U}_k$ for frequency k.

$$C^k = \begin{bmatrix} c_{11}^k & c_{12}^k & \cdots & c_{1M}^k \\ c_{21}^k & c_{22}^k & \cdots & c_{2M}^k \\ \vdots & \vdots & \ddots & \vdots \\ c_{M1}^k & c_{M2}^k & \cdots & c_{MM}^k \end{bmatrix} \quad (9)$$

A coherence measure may now be obtained for this single frequency by summing over all the entries in $C^k$. Summing the diagonal entries in $C^k$ gives the energy for all M traces at frequency k.

$$E_k = \sum_{i=1}^{M} A_{ki}^2 = \sum_{i=1}^{M} c_{ii}^k = \text{Energy for frequency } k \quad (10)$$

The total energy could be obtained by summing over all frequencies $k = 1, 2, \ldots, K$.

The single frequency coherence measure is now obtained by summing over all the terms in matrix $C^k$. To facilitate discussion that is to come later in this paper it is worthwhile to express the summation of $C^k$ in the following way.

$$S_c^k = E^k + \sum_{i=1}^{M} \sum_{j=i+1}^{M} (c_{ij}^k + c_{ji}^k) \quad (11)$$

The summation in eq. (11) has been rearranged in order to accentuate the relationship between cross-diagonal terms in eq. (9). The effect of pairing cross diagonal terms may be seen in the following equation.

$$
\begin{aligned}
c_{ij}^k + c_{ji}^k &= A_{ki}A_{kj}e^{i(\alpha_{ki}-\alpha_{kj})} + A_{kj}A_{ki}e^{i(\alpha_{kj}-\alpha_{ki})} \\
&= A_{ki}A_{kj}[\cos(\alpha_{ki}-\alpha_{kj}) + \cos(\alpha_{kj}-\alpha_{ki}) + \\
&\quad i\sin(\alpha_{ki}-\alpha_{kj}) + i\sin(\alpha_{kj}-\alpha_{ki})] \\
&= A_{ki}A_{kj}[2\cos(\alpha_{ki}-\alpha_{kj})] = A_{ki}A_{kj}[2\cos(\Delta\alpha_{ij}^k)].
\end{aligned}
\quad (12)
$$

Several points need to be made in reference to eq. (12). First, the sine function is an odd function and thus drops out during summation when the phase is reversed (i.e. $\sin(\Delta\alpha_{ij}^k) = -\sin(\Delta\alpha_{ij}^k)$). The cosine term on the other hand is an even function and adds constructively regardless of the phase polarity (i.e. $\cos(\Delta\alpha_{ij}^k) = \cos(\Delta\alpha_{ij}^k)$). In other words, the sine function registers both the magnitude and direction in the argument. The cosine function registers only the magnitude and ignores the direction. This feature will be exploited later in the discussion. For now the reduced expression for the covariance matrix for frequency k is expressed as, $$
C_k = 
\begin{bmatrix}
A_{k1}^2 & A_{k1}A_{k2}e^{i(\alpha_{k1}-\alpha_{k2})} & \cdots & A_{k1}A_{kM}e^{i(\alpha_{k1}-\alpha_{kM})} \\
A_{k2}A_{k1}e^{i(\alpha_{k2}-\alpha_{k1})} & A_{k2}^2 & \cdots & A_{k2}A_{kM}e^{i(\alpha_{k2}-\alpha_{kM})} \\
\vdots & \vdots & \ddots & \vdots \\
A_{kM}A_{k1}e^{i(\alpha_{kM}-\alpha_{k1})} & A_{kM}A_{k2}e^{i(\alpha_{kM}-\alpha_{k2})} & \cdots & A_{kM}^2
\end{bmatrix}
\quad (13)
$$

Continuing in similar manner, a suite of matrices may be created for a desired number of frequencies or bandwidth that satisfy certain processing criteria. Thus for each frequency k a frequency dependent matrix $C^k$ may be generated. The full covariance matrix is then obtained as a weighted sum over all K frequencies with appropriately chosen weights $s_k$, k=1, 2, ..., K as in eq. (14).

$$
C = \sum_{k=1}^{K} s_k C^k \quad (14)
$$

The weights may represent a frequency domain filter or taper or any other frequency-weighting criterion. This results in a customized coherence computation as a function of frequency. This allows considerable freedom in selecting frequencies that are relevant for revealing and analyzing the underlying geology.

Wavelet Domain Coherence Measures

Although the term frequency is common in the geophysical community, in order to emphasize the change in approach, wavelet terminology will be used in the following discussion. The term scale will replace the term frequency, so that low frequencies correspond to coarse scales and high frequencies to fine scales.

In the previous discussion the concept of a moving analysis volume was used for the computations described. The analysis volume was described as a rectangular prism having constant dimensions in three directions (i.e. nt×nx× ny). The fact that geology can occur on a wide range of scales would suggest that the analysis volume should be more accommodating. This may lead to the consideration of techniques that are not limited to a single scale or window size, but rather are able to capture information on a number of different scales.

The Short Time Fourier Transform (STFT) is limited to a single window size for all frequencies and thus is not optimum when representing geological features that are often manifested on a wide range of scales. In a fixed window size fine scales lose resolution when using large windows and coarse scales suffer from not being fully sampled when using small windows. Fixed window dimensions therefore have a drawback in that they cannot accommodate all scales represented by the data. Wavelets overcome these restrictions by using a suite of scale dependent wavelets in order to represent features on all scales. Coarse scale features are well represented by using coarse scale wavelets (i.e. large windows). Fine scale features are also well represented by using fine scale wavelets (i.e. small windows). Wavelets thus have the advantage of being able to accommodate both fine and coarse scales contained in data.

The basic idea behind wavelets is to construct a basic shape called the mother wavelet, which is then stretched and squeezed to form a suite of wavelets that span the different scales. Ideally, these wavelets would form an orthonormal basis (i.e. a set of wavelets with different scales such that each wavelet is normalized to unity and orthogonal to all the other wavelets in the set).

Figure 1:
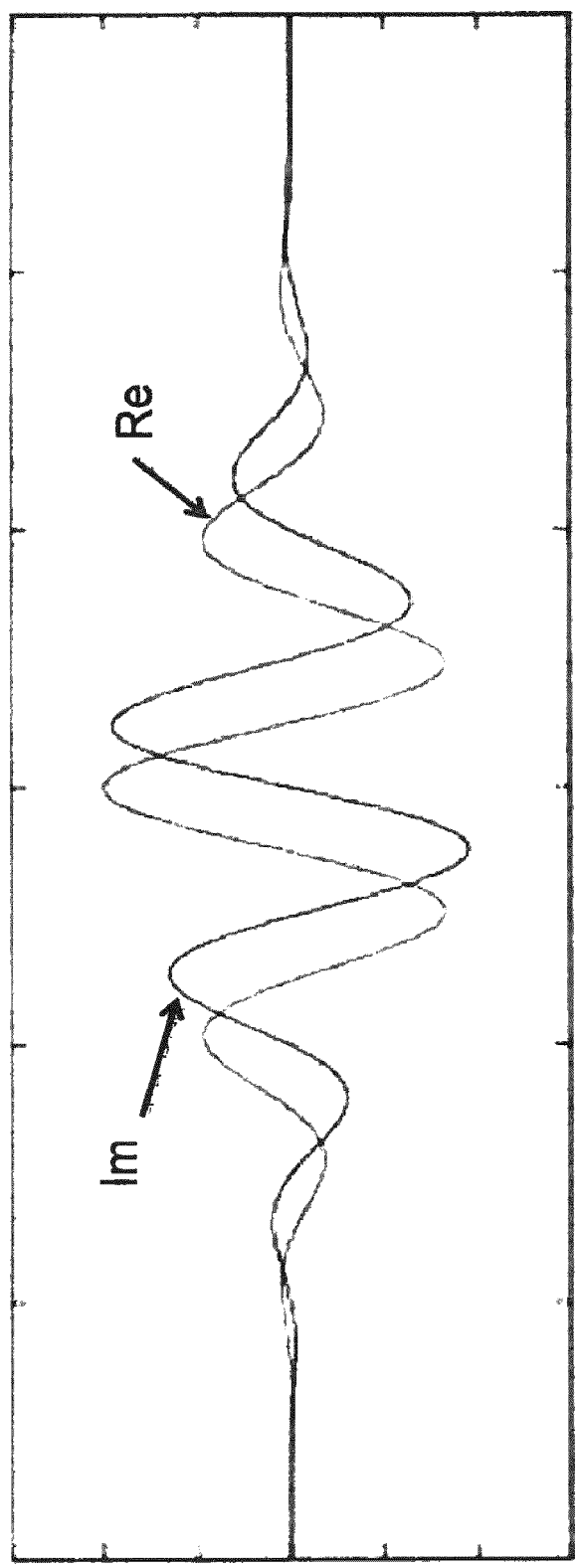
FIG. 1 shows the real and imaginary parts of the mother wavelet for the Morlet wavelet.

Wavelets first appeared in the geophysical community and were later rigorously extended and analyzed by the mathematical community. The paper by Goupillaud, Grossmann and Morlet originally introduced the Morlet wavelet, which was named after Jean Morlet in 1984. FIG. 1 shows the mother wavelet for the Morlet wavelet. Since the Morlet wavelet is a complex wavelet, the real ("Re") and imaginary ("Im") parts are depicted. The tapering of the cosine and sine functions results in this wavelet having localization in both the original and transformed domains.

Although the Morlet wavelet does not strictly form an orthonormal basis, it works well with seismic data because of its similarity to the "wiggly" nature of a seismic trace. Although mathematicians were later able to develop wavelets that form orthonormal sets they were less similar to and not as ideal for seismic data.

The continuous wavelet transform (CWT) is applied to a signal $f(t)$ according to the following definition.

$$
F(a,b) = \frac{1}{\sqrt{a}} \int f(t)\tilde{\psi}\left(\frac{t-b}{a}\right) dt \quad (15)
$$

Unlike the STFT, the CWT uses different scales and thus windows to analyze and represent scale dependent features in the signal. This approach also has the advantage of having localization in both the original and transformed domains. In comparison, the STFT can't have localization for all frequencies in both domains due to the limitation imposed by a single window size.

Figure 2:
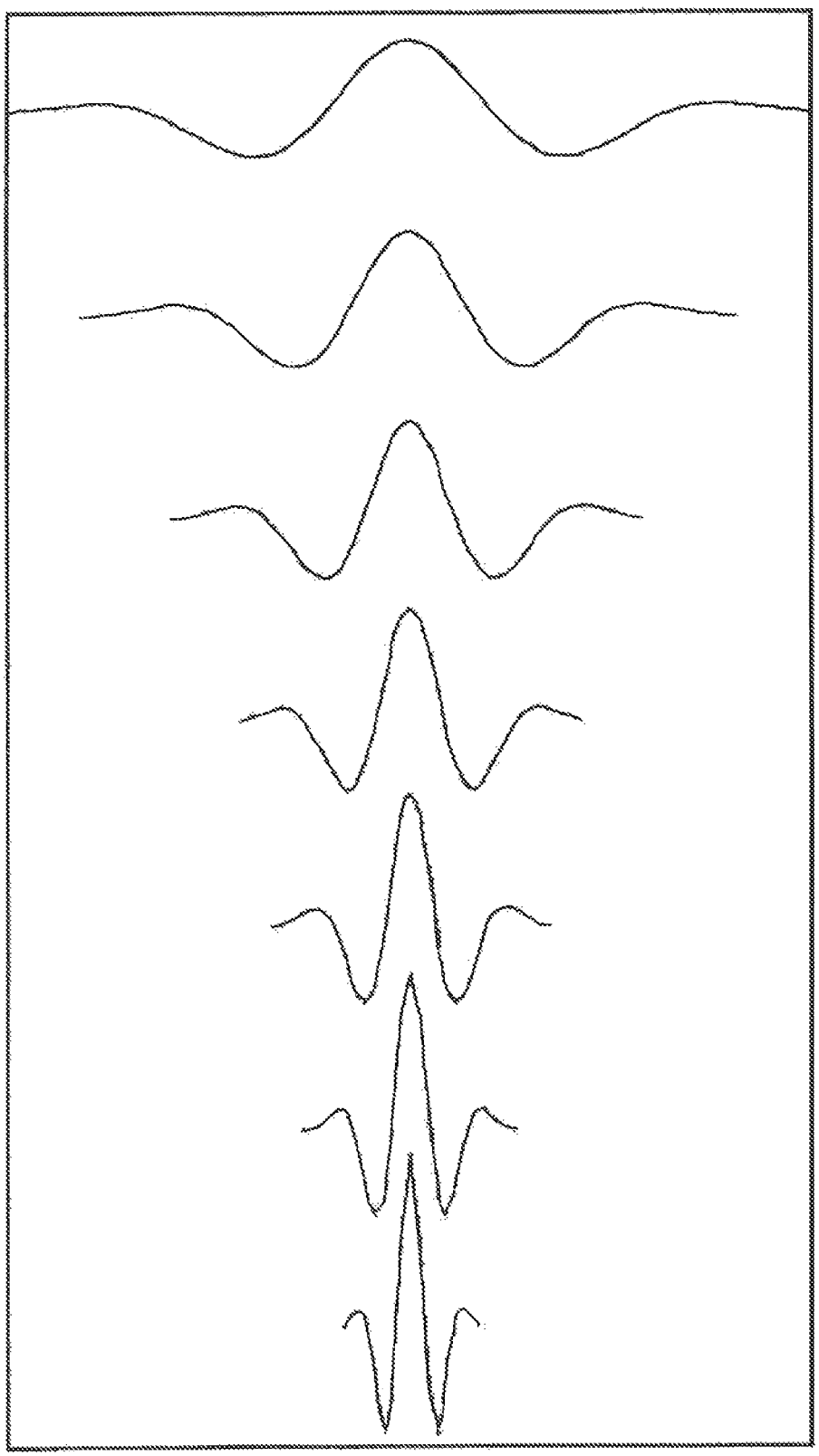
FIG. 2 shows, the real part of Morlet wavelets at different scales.

In Eq. (15), F(a,b) represents the convolution of a signal $f(t)$ with a suite of complex wavelets at different scales defined by the parameter a (see FIG. 2 for an example of the real part of different scale Morlet wavelets).

The function $\tilde{\psi}(t)$ is a continuous function called the mother wavelet and the tilde represents the complex conjugate operation. In Eq. (15) the parameters a and b represent the scale and shift respectively. The scale parameter a squeezes and stretches the mother wavelet in order to represent the different scales. Each scale dependent wavelet is shifted (i.e. convolved) along the signal until the entire signal has been transformed.

These wavelets are complex with real and imaginary parts (with a 90° phase difference) they may be expressed in terms of an amplitude and phase. A covariance matrix for a single scale may now be constructed accordingly. Denoting the amplitude and phase by B and β respectively, results in a pseudo-covariance matrix for a single scale as follows. The term "pseudo-covariance" is adopted here and in the following discussion due to a lack of terminology for this procedure.

$$C^k = \begin{bmatrix} B_{k1}^2 & B_{k1}B_{k2}\cos(\Delta\beta_{12}^k) & \cdots & B_{k1}B_{kM}\cos(\Delta\beta_{1M}^k) \\ B_{k2}B_{k1}\cos(\Delta\beta_{21}^k) & B_{k2}^2 & \cdots & B_{k2}B_{kM}\cos(\Delta\beta_{2M}^k) \\ \vdots & \vdots & \ddots & \vdots \\ B_{kM}B_{k1}\cos(\Delta\beta_{M1}^k) & B_{kM}B_{k2}\cos(\Delta\beta_{M2}^k) & \cdots & B_{kM}^2 \end{bmatrix} \quad (16)$$

Although the matrices in (13) and (16) look similar, there is an important difference. The covariance matrix in eq. (16) is scale dependent and changes in character for each scale. It is important to note that utilization of coherence as it is conventionally defined is applied to fixed windows. The method as described herein combines different scales from the wavelet transform, which consists of multiple scales or windows, which departs from the definition of coherence. Thus, the conventional definition of coherence no longer applies. This is a novel and non-obvious concept as the conventional manipulation of seismic data does not provide a foundation for applying wavelets to computing coherence. Since coherence in the usual definition is restricted in conventional application to fixed windows, it is a non-obvious approach to apply the variation of coherence as described herein to the wavelet scale domain.

Letting K represent the number of scales given by, $a_1$, $a_2$, $a_3$, ..., $a_k$, results in an expression for the weighted sum over scales. This demonstrates the novelty of using a similarity measure in the wavelet domain, which departs from previous similarity measures where a single window was used.

$$C = s(a_1)C(a_1) + s(a_2)C(a_2) + \cdots + s(a_2)C(a_K) = \sum_{k=1}^{K} s(a_k)C(a_k) \quad (17)$$

Note that this time the individual weights and matrices are functions of scale, so that the sum forms a scale dependent pseudo-covariance matrix. In Eq. (17), the fine scales represent features of short duration while the coarser scales represent features of long duration. The weights form a scale dependent filter and may be constructed in many different ways depending on the objective. It is unclear whether this sum qualifies as a covariance matrix due to the combination of different scales and thus will be described with the term pseudo-covariance. Also, it is no longer correct to label the traces as being in an analysis volume since there is no single volume used to produce the sum in eq. (17). Rather there are several volumes with each volume being different in size depending on the scale used. To accentuate the difference of this approach, the term "analysis multivolume" will replace the term "analysis volume" in the following discussion. This is an important point that demonstrates a marked difference from conventional technology.

Thus far only the Morlet wavelet has been mentioned. But in a general sense the method proposed here may be used with any desired suite of basis functions that are advantageous for the task. This concept may be extended to any suit of components that in a loose manner represent a basis. For example, a matching pursuit scheme could be used where the components are selected from a database formed in some manner in order to best represent or process the data. This goes beyond the usual definition of correlation or coherence in the geophysical literature.

Matrices, Grids and Graphs

In equations (12), (13) and (16) it was demonstrated how the sine term drops out when performing a summation in order to obtain a coherence measure. A different approach is now described for the development to follow. Further departure from the previous discussion means that the term "pseudo-covariance matrix" is no longer sufficient to describe the process. A different approach is therefore taken in defining an embodiment of the invention. As will be apparent to one of skill in the art, the sine term does not represent any sort of coherence measure or correlation between signals. Also, coherence is a symmetric or even function that ignores the sign of the difference. Additionally, the conventional definition of coherence in any sense assigns the highest values when signals are the same or similar. Thus, a novel and non-obvious approach to manipulation of data on grids and directed graphs will be described. The images produced by these computations provide enhanced resolution of subterranean structures, examples of which are shown in FIGS. 11-23.

Starting from the wavelet transform for a single scale prior to when the sine term cancels results in a full complex representation. The terms cosine matrix and real matrix are interchangeable as are the terms sine matrix and imaginary matrix.

$$C^k = \begin{bmatrix} B_{k1}^2 & B_{k1}B_{k2}\cos(\Delta\beta_{12}^k) & \cdots & B_{k1}B_{kM}\cos(\Delta\beta_{1M}^k) \\ B_{k2}B_{k1}\cos(\Delta\beta_{21}^k) & B_{k2}^2 & \cdots & B_{k2}B_{kM}\cos(\Delta\beta_{2M}^k) \\ \vdots & \vdots & \ddots & \vdots \\ B_{kM}B_{k1}\cos(\Delta\beta_{M1}^k) & B_{kM}B_{k2}\cos(\Delta\beta_{M2}^k) & \cdots & B_{kM}^2 \end{bmatrix} + \quad (18)$$

$$i \begin{bmatrix} 0 & B_{k1}B_{k2}\sin(\Delta\beta_{12}^k) & \cdots & B_{k1}B_{kM}\sin(\Delta\beta_{1M}^k) \\ B_{k2}B_{k1}\sin(\Delta\beta_{21}^k) & 0 & \cdots & B_{k2}B_{kM}\sin(\Delta\beta_{2M}^k) \\ \vdots & \vdots & \ddots & \vdots \\ B_{kM}B_{k1}\sin(\Delta\beta_{M1}^k) & B_{kM}B_{k2}\sin(\Delta\beta_{2M}^k) & \cdots & 0 \end{bmatrix}$$

or $$C^k = C_R^k + iC_I^k.$$

Equation (18) contains both the real and imaginary portions of a single scale matrix. A matrix of this type may be referred to generally as a comparison matrix. The two matrices $C_R^k$, and $C_I^k$, are the result of projections onto axes that are orthogonal complements to each other implying that the information they contain is different. The implication of dissimilar information suggests that these matrices require different treatment. The following discussion describes one embodiment of the method and the reasoning for the new approach to the manipulation of these matrices. According to conventional techniques, the sine term does not come into use when computing coherence in the frequency domain. Further, the sine matrix requires different treatment since it is direction sensitive. This is contrary to the cosine matrix, which is not direction sensitive. Thus, the methodology as described herein goes beyond conventional techniques based on established definitions and applications of coherence in frequency or and wavelet domains. The following includes a description of a new development where grids and directed graphs are used to deal with the direction sensitive nature of the sine matrix. The connectivity of the grid points becomes important in these calculations.

Note that although for illustrative purposes, the real and imaginary parts of the comparison matrix of Equation (18) will be referred to as the cosine and sine matrices, respectively. However, in various embodiments, the matrix may include other functional forms. What is important is that the matrix is separated into a portion that is symmetric under exchange of the order in which phase difference are determined (and therefore lacking directional information), and a portion that is asymmetric under such an exchange (which can be used to extract directional information.

Figure 3:
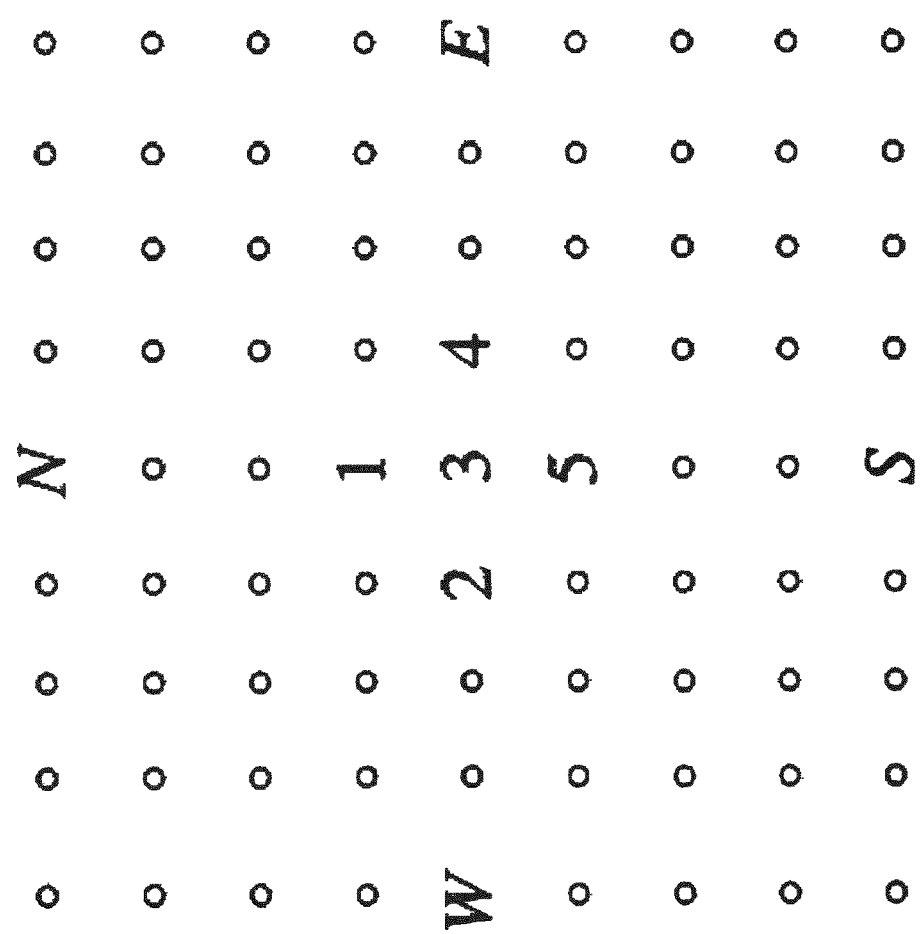
FIG. 3 shows a grid of trace locations with a selected computational template.

Data obtained from seismic exploration are acquired at specific geographical locations and therefore exist on a discrete grid that is related to geographical coordinates. After processing, the data often reside on a grid with predetermined in-line spacing (dy) and cross-line spacing (dx). The grid therefore reflects distances between seismic traces and indirectly has an effect on subsurface geology. A number of algorithms are designed to process this data and often use a neighborhood or set of traces in the proximity of a center trace to compute a relevant attribute. A partial grid and a simply defined local neighborhood or set of five points (1-5) might be as depicted in FIG. 3. FIG. 3 implies equal spacing in both the NS and EW directions. In practice the spacing in the two directions can be quite different and thus have different spatial resolution in the two directions.

In practice, a neighborhood or set of traces might have a variety of geometries with varying numbers of traces. To accentuate the geographical nature of this grid, compass directions are also included. The five traces in FIG. 3, which represents one possible configuration, form a simple template and are used to demonstrate the process. The five traces therefore form a template that progresses through the entire grid volume. These concepts are easily extended to traces that form larger and more complex templates.

The five traces (points 1-5) in FIG. 3 may also be represented with graph theory, which is convenient for representing interactions for many applications. A graph is an ordered pair G=(V,E) comprising a set of vertices or nodes v together with a set of edges E. An edge links two vertices. A directed graph has directional edges. The nature of this graph may be represented in terms of an adjacency matrix. Development here is due to the direction sensitive sine matrix defined previously in eq. (18). The following clarifies this very point.

For this discussion, a convenient way of applying directionality constraints to traces with respect to their physical location is through a directed graph and signed adjacency matrix. The signed adjacency matrix for a directed graph is defined as an n×n matrix with entries $d_{ij}$, where n is the number of vertices or nodes. Entry $d_{ij}$ describes the interaction between nodes i and j in the following way. If an edge leaves node i and enters node j then entry $d_{ij}$=+1 and if the direction is reversed then $d_{ij}$=−1. Otherwise the entry is 0, indicating absence of an edge. Arrows such as in FIGS. 9 and 10 indicate the directionality of the edge and if directionality were reversed, then the signs would be reversed.

A note on traces, grid points and nodes both traces, grid points and nodes are important for this discussion. Traces represent signals having a certain number of samples (time or depth). A trace alone does not indicate anything about its position or its relative position to other traces. Traces may be viewed as extending downward into the earth thus giving information inside the earth. Grid points or a grid indicate the horizontal distribution of traces. Spacing between grid points represent the spacing between traces. If actual physical coordinates are assigned to grid points then these represent actual geographical coordinates. Nodes are used in defining a graph and its relationship to other nodes (i.e. local communication and information flow) through the positions and directions of the edges. Traces, grid points and nodes are related in that they represent different aspects of how the procedure deals with seismic data.

Although a graph and associated adjacency matrix have many applications, in this case they represent interaction between seismic traces on a grid. The algorithm uses these concepts to compute certain desired results that are beneficial for the interpretation of seismic data. As an example the 5 traces (1-5) of FIG. 3 are shown in FIGS. 4 and 5.

In FIG. 4 (panel a), a template in plan view of the 5 grid points (i.e. trace locations) is depicted. These are locations where seismic traces reside. Note that although the location of the traces is described there is no information about interaction between these traces. In FIG. 4 (panel b), the 5 grid points are represented as 5 nodes. These nodes no longer represent physical locations but are a convenient way to describe interaction through the edges that connect them. Thus the graph in FIG. 4 (panel b) shows that center grid point 3 (trace 3) communicates with all the other grid points (traces) and all grid points (traces) communicate with grid point 3 (trace 3). No other communication is present. Also the edges in this case don't have arrows, which indicates that the communication flows both ways. The loops at each node in the graph indicate that each node also communicates with itself. The same information is illustrated in the adjacency matrix A in FIG. 4 (panel c). A one in row i and column j indicates that grid point i communicates with grid point j. The ones along the diagonal in FIG. 4 (panel c) indicate that each node communicates with itself and are equivalent to the loops at each node in FIG. 4 (panel b). Zeros in FIG. 4 (panel c) indicate no communication or interaction is present between those grid points (traces). Two-way communication is indicated by all nonzero entries being positive.

The same grid FIG. 5 (panel a) may be used to demonstrate a different situation. FIG. 5 (panel b) shows that communication between all grid points is allowed by edges joining all possible nodes and thus all possible pairings of grid points (called a complete graph). Comparison of FIG. 4 (panel b) and FIG. 5 (panel b) reveals the difference. The adjacency matrix with all ones in FIG. 5 (panel c) also reflects this situation. Thus FIGS. 4 and 5 demonstrate that for a fixed grid very different types of communication may be defined. Whereas the graph in FIG. 4 restricts communication, the graph in FIG. 5 does not.

Graphs thus create a convenient way to describe flow of information and the adjacency matrix is useful for mathematical manipulation on a grid. The discussion in this section thus far focused on the geometric aspects of information flow between grid/trace locations. It is necessary to next describe what information is actually being communicated and how it is being used.

For wavelet domain processing, amplitudes and phases between traces are being used to compute attributes of the seismic data that reveal geologic information. After application of the CWT the five traces in FIG. 3 have grid-oriented amplitudes and phases for a single scale as demonstrated in FIG. 6. These are complex valued matrices as was seen in Eq. (18). It turns out that the difference between the real and imaginary matrices allows different treatment for these matrices. More detailed discussion on this aspect follows.

As was mentioned previously, the cosine function is an even function that treats positive and negative phase changes equally. Thus in eq. (18) even though $\Delta\beta_{ji}=-\Delta\beta_{ij}$, $\cos(\Delta\beta_{ji})=\cos(\Delta\beta_{ij})$. The undirected graphs in FIGS. 4 and 5 are well suited for that property since an undirected graph does not take into account the sign of the argument and thus the geological structural implications associated with phase changes. This suggests that the graph associated with the matrix $C_R^k$ should in fact be an undirected graph, thus ignoring the implications regarding the sign of the phase change. In addition, the coupling of certain grid points (traces) indicating a preferred direction is not as critical in this case, although this might be useful in certain cases.

The situation changes for the matrix $C_I^k$, which is composed of sine terms. In this case direction does matter and directed graphs may be designed to allow communication in preferred directions. In view of this fact, geometry is of greater importance for the matrix $C_I^k$. For any given grid point or trace location there is a simple relationship regarding the distances and angles to all other trace locations (FIG. 7).

In this case there may also be a specified direction for the flow of information as indicated by the arrows in FIG. 7. For the associated adjacency matrix, the placement of a ±1 in the appropriate slot is used to indicate the desired direction. In FIG. 8 a 3×3 template (i.e. 9 traces) is used to demonstrate this. The graph in this case would describe communication via a nine-sided polygon or a nonagon. In order to accentuate the geographical aspect of the situation, compass directions are included for the 9-point template. In practice the templates can become quite larger. For example, FIGS. 11-23 utilize a 25-point template. The dashed lines in FIG. 8 do not imply any sort of communication but are included to accentuate the shape.

To indicate directional communication for the scenario in FIG. 8, the nonagon must be converted into a directed graph. Communications for two situations are described. By defining flow of information between selected trace locations, communication from West to East is shown in FIG. 9 (panel a) and from North to South in FIG. 9 (panel b). Note that the direction of the communication is achieved by the direction of arrows in these directed graphs. Reversing directions would simply flip the arrowheads.

Note that although cardinal directions (North, South, East and West) are used herein for, illustrative purposes to label directions along the grid, the techniques described herein may be applied generally to grids arrange along any other directions. For example, a grid of trace locations could equally well be laid out with the in-line direction running Northwest to Southeast, and the orthogonal cross-line direction running Northeast to Southwest.

The preferred directions of the two graphs in FIG. 9 are defined by the two associated adjacency matrices $A_{WE}$ and ⊠ in Eq. (19). The subscripts are included to indicate the direction of information flows. The subscript $_{WE}$ indicates that information is flowing from West to East. The +1 in row 1 and column 2 of the adjacency matrix indicates that information flows from trace 1 to trace 2. This is also indicated by the direction of the arrow in FIG. 9 (panel a). The sign change for the −1 in row 2 and column 1 indicates a negative flow from trace 1 to trace 2. Each entry in the matrix is associated with a specific direction determined by the ordering of the graph itself.

$$A_{WE} = \begin{bmatrix} 0 & 1 & 1 & 0 & 0 & 0 & 0 & 0 & 0 \\ -1 & 0 & 1 & 0 & 0 & 0 & 0 & 0 & 0 \\ -1 & -1 & 0 & 0 & 0 & 0 & 0 & 0 & 0 \\ 0 & 0 & 0 & 0 & 1 & 1 & 0 & 0 & 0 \\ 0 & 0 & 0 & -1 & 0 & 1 & 0 & 0 & 0 \\ 0 & 0 & 0 & -1 & -1 & 0 & 0 & 0 & 0 \\ 0 & 0 & 0 & 0 & 0 & 0 & 0 & 1 & 1 \\ 0 & 0 & 0 & 0 & 0 & 0 & -1 & 0 & 1 \\ 0 & 0 & 0 & 0 & 0 & 0 & -1 & -1 & 0 \end{bmatrix} A_{NS} = \tag{19}$$

$$\begin{bmatrix} 0 & 0 & 0 & 1 & 0 & 0 & 1 & 0 & 0 \\ 0 & 0 & 0 & 0 & 1 & 0 & 0 & 1 & 0 \\ 0 & 0 & 0 & 0 & 0 & 1 & 0 & 0 & 1 \\ -1 & 0 & 0 & 0 & 0 & 0 & 1 & 0 & 0 \\ 0 & -1 & 0 & 0 & 0 & 0 & 0 & 1 & 0 \\ 0 & 0 & -1 & 0 & 0 & 0 & 0 & 0 & 1 \\ -1 & 0 & 0 & -1 & 0 & 0 & 0 & 0 & 0 \\ 0 & -1 & 0 & 0 & -1 & 0 & 0 & 0 & 0 \\ 0 & 0 & -1 & 0 & 0 & -1 & 0 & 0 & 0 \end{bmatrix}$$

The description of FIGS. 3-9 and the associated calculations demonstrate the point how grids and their directional connectivity are of paramount importance in building the sine matrices. It is also demonstrated that identical grids with different connectivity and direction can give much different results. The concept of directional manipulation has not been conventionally used with a wavelet transform over many scales. Also, conventional techniques do not combine directivity over many scales or frequencies, especially in matrices, due to the prevailing definition of coherency.

A convenient way to consolidate all the previously discussed information is through the Hadamard product. The Hadamard product for two matrices with the same dimensions is defined by point-wise multiplication of the entries in the two matrices in the following way. Equation (20) demonstrates this process.

$$\begin{bmatrix} h_{11} & h_{12} & \cdots & h_{1M} \\ h_{21} & h_{22} & \cdots & h_{2M} \\ \vdots & \vdots & \ddots & \vdots \\ h_{N1} & h_{N2} & \cdots & h_{NM} \end{bmatrix} \circ \begin{bmatrix} g_{11} & g_{12} & \cdots & g_{1M} \\ g_{21} & g_{22} & \cdots & g_{2M} \\ \vdots & \vdots & \ddots & \vdots \\ g_{N1} & g_{N2} & \cdots & g_{NM} \end{bmatrix} = \tag{20}$$

$$\begin{bmatrix} h_{11}g_{11} & h_{12}g_{12} & \cdots & g_{1M}h_{1M} \\ h_{21}g_{21} & h_{22}g_{22} & \cdots & h_{2N}g_{2M} \\ \vdots & \vdots & \ddots & \vdots \\ h_{N1}g_{N1} & h_{N2}g_{N2} & \cdots & h_{NM}g_{NM} \end{bmatrix}$$

Denoting $s_v^k - \sin(\Delta\beta_v^k)$ gor the sake of convenience, the Hadamard product may now be calculated between the adjacency matrix and sine matrix for the West-East directed graph in FIG. 9 as $A_{WE}oC_1{}^k$. Note that the resulting matrix given in eq. (21) has entries that only give information about phases changes in the direction going from West to East. The matrix in eq. (21) is composed of independent blocks (i.e. a block matrix) an indication that communication is restricted to occur between each of the three lines in the East-West direction. A similar procedure may be applied by using the ⊠ matrix to give $A_{NS}oC_1{}^k$. This would result in a different matrix with entries in locations that allow information flow from North to South. This would also result in a block matrix once the grid numbers were adjusted or equivalently the matrices were permuted. Using Hadamard matrices allows the application of templates required for dealing with directed and restricted graphs.

$$A_{WE}oC = \begin{bmatrix} 0 & 1 & 1 & 0 & 0 & 0 & 0 & 0 & 0 \\ -1 & 0 & 1 & 0 & 0 & 0 & 0 & 0 & 0 \\ -1 & -1 & 0 & 0 & 0 & 0 & 0 & 0 & 0 \\ 0 & 0 & 0 & 0 & 1 & 1 & 0 & 0 & 0 \\ 0 & 0 & 0 & -1 & 0 & 1 & 0 & 0 & 0 \\ 0 & 0 & 0 & -1 & -1 & 0 & 0 & 0 & 0 \\ 0 & 0 & 0 & 0 & 0 & 0 & 0 & 1 & 1 \\ 0 & 0 & 0 & 0 & 0 & 0 & -1 & 0 & 1 \\ 0 & 0 & 0 & 0 & 0 & 0 & -1 & -1 & 0 \end{bmatrix} \circ \quad (21)$$

$$\begin{bmatrix} 0 & s_{12}^k & s_{13}^k & s_{14}^k & s_{15}^k & s_{16}^k & s_{17}^k & s_{18}^k & s_{19}^k \\ s_{21}^k & 0 & s_{23}^k & s_{24}^k & s_{25}^k & s_{26}^k & s_{27}^k & s_{28}^k & s_{29}^k \\ s_{31}^k & s_{32}^k & 0 & s_{34}^k & s_{35}^k & s_{36}^k & s_{37}^k & s_{38}^k & s_{39}^k \\ s_{41}^k & s_{42}^k & s_{43}^k & 0 & s_{45}^k & s_{46}^k & s_{47}^k & s_{48}^k & s_{49}^k \\ s_{51}^k & s_{52}^k & s_{53}^k & s_{54}^k & 0 & s_{56}^k & s_{57}^k & s_{58}^k & s_{59}^k \\ s_{61}^k & s_{62}^k & s_{63}^k & s_{64}^k & s_{65}^k & 0 & s_{67}^k & s_{68}^k & s_{69}^k \\ s_{71}^k & s_{72}^k & s_{73}^k & s_{74}^k & s_{75}^k & s_{76}^k & 0 & s_{78}^k & s_{79}^k \\ s_{81}^k & s_{82}^k & s_{83}^k & s_{84}^k & s_{85}^k & s_{86}^k & s_{87}^k & 0 & s_{89}^k \\ s_{91}^k & s_{92}^k & s_{93}^k & s_{94}^k & s_{95}^k & s_{96}^k & s_{97}^k & s_{98}^k & 0 \end{bmatrix} =$$

$$\begin{bmatrix} 0 & s_{12}^k & s_{13}^k & 0 & 0 & 0 & 0 & 0 & 0 \\ -s_{21}^k & 0 & s_{23}^k & 0 & 0 & 0 & 0 & 0 & 0 \\ -s_{31}^k & -s_{32}^k & 0 & 0 & 0 & 0 & 0 & 0 & 0 \\ 0 & 0 & 0 & 0 & s_{45}^k & s_{46}^k & 0 & 0 & 0 \\ 0 & 0 & 0 & -s_{54}^k & 0 & s_{56}^k & 0 & 0 & 0 \\ 0 & 0 & 0 & -s_{64}^k & -s_{65}^k & 0 & 0 & 0 & 0 \\ 0 & 0 & 0 & 0 & 0 & 0 & 0 & s_{78}^k & s_{79}^k \\ 0 & 0 & 0 & 0 & 0 & 0 & -s_{87}^k & 0 & s_{89}^k \\ 0 & 0 & 0 & 0 & 0 & 0 & -s_{97}^k & -s_{98}^k & 0 \end{bmatrix} =$$

$$\begin{bmatrix} 0 & s_{12}^k & s_{13}^k & 0 & 0 & 0 & 0 & 0 & 0 \\ s_{12}^k & 0 & s_{23}^k & 0 & 0 & 0 & 0 & 0 & 0 \\ s_{13}^k & s_{23}^k & 0 & 0 & 0 & 0 & 0 & 0 & 0 \\ 0 & 0 & 0 & 0 & s_{45}^k & s_{46}^k & 0 & 0 & 0 \\ 0 & 0 & 0 & s_{45}^k & 0 & s_{56}^k & 0 & 0 & 0 \\ 0 & 0 & 0 & s_{45}^k & s_{56}^k & 0 & 0 & 0 & 0 \\ 0 & 0 & 0 & 0 & 0 & 0 & 0 & s_{78}^k & s_{79}^k \\ 0 & 0 & 0 & 0 & 0 & 0 & s_{78}^k & 0 & s_{89}^k \\ 0 & 0 & 0 & 0 & 0 & 0 & s_{79}^k & s_{89}^k & 0 \end{bmatrix}$$

Note that in Equation (21) the signs in the adjacency matrix were used to avoid cancellation of terms across the diagonal and then replaced with entries giving a symmetric matrix. The summation of the matrix in Eq. (21) will therefore not cancel itself by summing terms across the diagonal.

The situation thus far has been simplified for purposes of clarity. Consider a more complicated situation where it is desired to capture information flow within a 45° cone going from West to East. Also considered this time is the fact that different distances between traces have implications for the different scales associated with those distances. In FIG. 10, two different scales are described by defining flows occurring between different grid points. The finer scales are shown as solid lines and the coarser scales are shown as dashed lines. The associated graph describes all flows with the solid (finer scales) and dashed (coarser scales) arrow lines emphasizing the different scales. The adjacency matrix and final Hadamard product are given in Eq. (22).

$$A_{WE}oC = \begin{bmatrix} 0 & 0 & 0 & 0 & 0 & 0 & 0 & 0 & 0 \\ 0 & 0 & 0 & -1 & 0 & 0 & 0 & 0 & 0 \\ 0 & 0 & 0 & -1 & -1 & 0 & 0 & 0 & 0 \\ 0 & 1 & 1 & 0 & 1 & 1 & 0 & 1 & 1 \\ 0 & 0 & 1 & -1 & 0 & 1 & 0 & 0 & 1 \\ 0 & 0 & 0 & -1 & -1 & 0 & 0 & 0 & 0 \\ 0 & 0 & 0 & 0 & 0 & 0 & 0 & 0 & 0 \\ 0 & 0 & 0 & -1 & 0 & 0 & 0 & 0 & 0 \\ 0 & 0 & 0 & -1 & -1 & 0 & 0 & 0 & 0 \end{bmatrix} \circ \quad (22)$$

$$\begin{bmatrix} 0 & s_{12}^k & s_{13}^k & s_{14}^k & s_{15}^k & s_{16}^k & s_{17}^k & s_{18}^k & s_{19}^k \\ s_{21}^k & 0 & s_{23}^k & s_{24}^k & s_{25}^k & s_{26}^k & s_{27}^k & s_{28}^k & s_{29}^k \\ s_{31}^k & s_{32}^k & 0 & s_{34}^k & s_{35}^k & s_{36}^k & s_{37}^k & s_{38}^k & s_{39}^k \\ s_{41}^k & s_{42}^k & s_{43}^k & 0 & s_{45}^k & s_{46}^k & s_{47}^k & s_{48}^k & s_{49}^k \\ s_{51}^k & s_{52}^k & s_{53}^k & s_{54}^k & 0 & s_{56}^k & s_{57}^k & s_{58}^k & s_{59}^k \\ s_{61}^k & s_{62}^k & s_{63}^k & s_{64}^k & s_{65}^k & 0 & s_{67}^k & s_{68}^k & s_{69}^k \\ s_{71}^k & s_{72}^k & s_{73}^k & s_{74}^k & s_{75}^k & s_{76}^k & 0 & s_{78}^k & s_{79}^k \\ s_{81}^k & s_{82}^k & s_{83}^k & s_{84}^k & s_{85}^k & s_{86}^k & s_{87}^k & 0 & s_{89}^k \\ s_{91}^k & s_{92}^k & s_{93}^k & s_{94}^k & s_{95}^k & s_{96}^k & s_{97}^k & s_{98}^k & 0 \end{bmatrix} =$$

$$\begin{bmatrix} 0 & 0 & 0 & 0 & 0 & 0 & 0 & 0 & 0 \\ 0 & 0 & 0 & s_{42}^k & 0 & 0 & 0 & 0 & 0 \\ 0 & 0 & 0 & s_{43}^k & s_{53}^k & 0 & 0 & 0 & 0 \\ 0 & s_{42}^k & s_{43}^k & 0 & s_{45}^k & s_{46}^k & 0 & s_{48}^k & s_{49}^k \\ 0 & 0 & s_{53}^k & s_{54}^k & 0 & s_{56}^k & 0 & 0 & s_{59}^k \\ 0 & 0 & 0 & s_{46}^k & s_{56}^k & 0 & 0 & 0 & 0 \\ 0 & 0 & 0 & 0 & 0 & 0 & 0 & 0 & 0 \\ 0 & 0 & 0 & s_{48}^k & 0 & 0 & 0 & 0 & 0 \\ 0 & 0 & 0 & s_{49}^k & s_{59}^k & 0 & 0 & 0 & 0 \end{bmatrix}$$

Because of the dependency between the East-West lines (flow no longer occurs along a single line) the resulting matrix may not be permuted into a block matrix. FIG. 10 shows only two examples of the type of configurations that may be used. Other connecting edges may be included. For example, traces 1-2, 1-3, 1-5, 1-6, 7-5, 7-6, 7-8 and 7-9 may have been included. This would have created several cones that satisfy a 45° limitation. A larger cone such as described by FIG. 10, would allow wider illumination of structure and geology but with a reduction in resolution. It is also possible to use different size templates and graphs for the different scales. For coarser scales, larger templates could be used to capture information for longer distances. This is part of the ongoing interaction between resolution and stability that has been of concern within many scientific disciplines. There are several factors in play that need to be considered. Thus factors such as distances and illumination angles are some of the parameters that have a direct bearing on scale and have an effect on the final results. This development illustrates how different the treatment of the sine matrix needs to be, in one embodiment.

As seen from the signed adjacency matrix, the addition of larger scale grid points results in more entries and thus a fuller matrix. There is considerable freedom in determining the size and shape of the template depending on the scale of the features detected. Templates that are useful in a practical sense can also vary greatly in both size and dimension. Larger templates will detect larger scale features and result in larger adjacency matrices. In practice templates using hundreds of traces may be designed and used to accomplish specific goals.

In addition the directionality defined by a directed graph may also vary greatly. For example, peaks and troughs may be detected by having directed graphs that point from a central grid point out to other grid points in all radial directions. A ridge or valley may be detected by having directed graphs pointing away from a line with a certain orientation out to grid points in directions away from the line. These may detect special features. This results in a more complicated algorithm where more factors need to be considered for the final result.

At this point a final computation will be performed to generate desired results. Suppose that through the CWT, K scales (with different length windows for each scale) are used. In addition the number of traces and spatial geometry/template are allowed to vary for each scale as well as for the real and imaginary matrices previously defined (allowing different treatment for the real and imaginary parts). This allows features of different spatial dimensions to be included in the final computations. This then involves a multi-scale computation for all three dimensions (t or z and x and y). The number of traces to be used for each scale is then defined as $M_k$, k=1, 2, ..., K. This means that the size of each matrix as given by Equations 18-22 will vary in size according to the size and configuration of each template. Also, in practice the cosine and sine matrices often have different dimensions (templates) and may use different scales. For the sake of simplicity Equation (18) does not reflect that fact. Making allowances for the different treatment of the real and imaginary matrices introduces the following notation. For each of the real and imaginary matrices the normalized summation vectors having $M_R^k$ and $M_I^k$ normalized entries of "1"s are defined as, $$U_R^k = \frac{1}{\sqrt{M_R^k}} \begin{bmatrix} 1 \\ 1 \\ \vdots \\ 1 \end{bmatrix}, \text{ such that } \|U_R^k\|_2 = 1 \tag{23}$$

$$U_I^k = \frac{1}{\sqrt{M_I^k}} \begin{bmatrix} 1 \\ 1 \\ \vdots \\ 1 \end{bmatrix}, \text{ such that } \|U_I^k\|_2 = 1$$

Equation (23) defines generic summation vectors for the real and imaginary matrices at a particular scale. The superscripts are included to allow different size matrices to be summed for different scales. The following definitions in addition to the summation vector in eq. (23) complete the required components for forming the final result for a single scale k.

$C_R^k$, $A_R^k$, $\alpha_R^k$: scale dependent real matrix, associated adjacency matrix and scaling factor for scale k $C_I^k$, $A_I^k$, $\alpha_I^k$: scale dependent imaginary matrix, associated adjacency matrix and scaling factor for scale k All the information is now available to define the interaction of all the parts. For a single scale k the real and imaginary parts are combined to produce a scalar value that will be referred to as a geologic factor at scale k.

$$G^k = \alpha_R^k U_R^{kT} A_R^k \circ C_R^k U_R^k + \alpha_I^k U_I^{kT} A_I^k \circ C_I^k U_I^k = G_R^k + G_I^k \tag{24}$$

The scalars $G_R^k$ and $G_I^k$ which result from summing over the real and imaginary parts in eq. (24) bring out different aspects of the data. FIG. 19 illustrates the nature of the type of information that is produced after summing over the different scales present in the matrix $G_R^k$, while FIG. 20 represents what is obtained by summing over scales present in the matrix $G_I^k$. FIG. 22 demonstrates how different the results can be depending on how the directional aspects of the template are designed. FIGS. 21 and 23 demonstrate the results after the full summation over scales is computed using eq. (24). The summation is given in eq. (25). Again, the difference in the results is due to different configurations of the templates. Choosing the appropriate templates can be important to produce the desired results.

In Eq. (24), the row vectors $U_R^{kT}$ and $U_I^{kT}$ are the transposes of the column vectors $U_R^k$ and $U_I^k$. The two scalars $\alpha_R^k$ and $\alpha_I^k$ are scalar weights chosen to accentuate different geologic features in the data contained in the real part (i.e. cosine matrix) vs. the imaginary part (i.e. sine matrix). As was previously mentioned, the real and imaginary parts reveal and extract complimentary information from the data. This may be seen from the way that the Hadamard products $A_R^k \circ C_R^k$ and $A_I^k \circ C_I^k$ are formed. They use different graphs and templates and therefore different adjacency matrices. The adjacency matrix that forms the Hadamard product with the real part $C_R^k$ is for an undirected graph and often is a complete graph (two-way communication between all nodes). It is foreseeable that this doesn't have to always be the case. The adjacency matrix that forms the Hadamard product with the imaginary part $C_I^k$ is for a directed graph and often uses specific grid points chosen to satisfy a desired objective. The real and imaginary parts could use templates that are different in size as well as connectivity. All these aspects are included through the various parts of eq. (24). FIGS. 20-23 illustrate how different templates for the real and imaginary parts give different results.

The value for $G^k$ in eq. (24) will be referred to as the partial geologic factor for scale k. A weighted sum using weights $s_k$, k=1, 2, . . . K over the different scales defined by Eq. (24) gives the desired result which will be referred to as the total geological factor or $G^F$ and given by, $$G_F = \sum_{k=1}^{K} s_k G^k \quad (25)$$

In Eq. (25), the weights define a scale dependent filter or taper that was mentioned previously. This allows attachment of different weights to different scales.

In the example above, directed graph based techniques were applied to traces transformed using a wavelet transformation to produce directional information. It is to be understood that similar techniques may be applied in cases where a different transformation is used. For example, the techniques described above could be applied to Fourier transformed traces. Although in this case the result would not leverage information over multiple scales, useful directional information may be obtained. For example, a person skilled in the art will recognize that a comparison matrix equivalent to Eq. (18), but with the scale index removed, could be constructed using traces transformed into the Fourier domain. An adjacency matrix corresponding to directed graphs on a measurement template of grid points could be applied to the imaginary part of this Fourier comparison matrix as described above to extract directional information.

Although the examples presented above have dealt with the processing of seismic trace information, it will be apparent to one skilled in the art the techniques described herein may be applied generally to process other types of data. The techniques described herein may be applied in any context where it is desirable to process a set of signals to determine coherence or other comparisons between the signals.

In particular, the techniques described herein involving wavelet transforms may be used in applications where it would be desirable to investigate the set of signals on a variety of scales.

Further, the techniques described herein involving directed graphs on measurement templates and/or associate adjacency matrices may be used in applications where it would be desirable to investigate directional properties of the signals (e.g. related to interactions between the signals in a selected direction or range of directions).

Exemplary applications outside of the seismic field include medical imaging, image processing, data compression, etc.

The scope of the present invention is not limited by what has been specifically shown and described hereinabove. Those skilled in the art will recognize that there are suitable alternatives to the depicted examples of materials, configurations, constructions and dimensions. Numerous references, including patents and various publications, are cited and discussed in the description of this invention. The citation and discussion of such references is provided merely to clarify the description of the present invention and is not an admission that any reference is prior art to the invention described herein. All references cited and discussed in this specification are incorporated herein by reference in their entirety.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to and/or receive communications from other devices. The display unit(s) may be provided, for example, to allow a user to view various information in connection with execution of the instructions. The user input device(s) may be provided, for example, to allow the user to make manual adjustments, make selections, enter data or various other information, and/or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

As used herein the term "light" and related terms (e.g. "optical") are to be understood to include electromagnetic radiation both within and outside of the visible spectrum, including, for example, ultraviolet and infrared radiation.

All definitions, as defined and used herein, should be understood to control over dictionary definitions, definitions in documents incorporated by reference, and/or ordinary meanings of the defined terms.

Variations, modifications and other implementations of what is described herein will occur to those of ordinary skill in the art without departing from the spirit and scope of the invention. While certain embodiments of the present invention have been shown and described, it will be obvious to those skilled in the art that changes and modifications may be made without departing from the spirit and scope of the invention. The matter set forth in the foregoing description and accompanying drawings is offered by way of illustration only and not as a limitation.

What is claimed is:

1. A system to detect hydrocarbon deposits, comprising:
at least one memory that stores seismic signal traces obtained from a seismic survey of a land surface or a seabed;
one or more processors in communication with the at least one memory, the one or more processors to:
retrieve, from the at least one memory, the seismic signal traces;
transform, via a wavelet transformation, the seismic signal traces to transformed signals at a first scale and a second scale;
determine scale dependent coherence information comprising a scale dependent covariance matrix for the first scale and the second scale of the transformed signals;
generate, from a combination of the scale dependent coherence information for the first scale and the second scale of the transformed signals, one or more images that indicate at least one of stratigraphic information or a presence of a hydrocarbon deposit; and
provide, to a display unit in communication with the one or more processors, the one or more images to cause the display unit to display the one or more images.

2. The system of claim 1, comprising the one or more processors to:
generate combined information for the first scale and the second scale of the transformed signals based on the scale dependent coherence information; and
generate, from the combined information for the first scale and the second scale, the one or more images that indicate the stratigraphic information and the presence of the hydrocarbon deposit.

3. The system of claim 1, comprising the one or more processors to:
generate combined information for the first scale and the second scale of the transformed signals based on the scale dependent coherence information;
identify seismic attribute information based on at least one of an amplitude or a phase of the combined information; and
generate, from the seismic attribute information, the one or more images.

4. The system of claim 1, comprising the one or more processors to:
generate, for the first scale and the second scale, a comparison matrix that compares the transformed signals for the first scale and the second scale;
determine direction dependent comparison information based on the comparison matrix;
identify seismic attribute information based on the direction dependent comparison information; and
generate, from the seismic attribute information, the one or more images that indicate the stratigraphic information and the presence of the hydrocarbon deposit.

5. The system of claim 1, comprising the one or more processors to:
generate combined information and a comparison matrix for the first scale and the second scale;
determine direction dependent comparison information based on the comparison matrix;
identify seismic attribute information based on at least one of an amplitude or a phase of the combined information and the direction dependent comparison information; and
generate, from the seismic attribute information, the one or more images that indicate the stratigraphic information and the presence of the hydrocarbon deposit.

6. The system of claim 1, wherein the scale dependent covariance matrix is indicative of a coherence of the transformed signals at a respective scale of the first scale and the second scale.

7. The system of claim 1, comprising the one or more processors to generate a seismic map based on the one or more images.

8. The system of claim 1, comprising the one or more processors to:
generate, based on the one or more images that indicates the at least one of the stratigraphic information or the presence of the hydrocarbon deposit, a topographical image.

9. The system of claim 1, comprising the one or more processors to:
generate, for the first scale and the second scale, a comparison matrix that compares a pair of transformed signals for the first scale and the second scale;
apply, to the comparison matrix, a filter to modify a directional property of the comparison matrix;
determine direction dependent comparison information based on the directional property of the comparison matrix; and
identify seismic attribute information based on the direction dependent comparison information.

10. The system of claim 9, wherein the filter to modify the directional property of the comparison matrix comprises an adjacency matrix to indicate information flows to or from the seismic signal traces.

11. The system of claim 9, wherein the comparison matrix comprises an imaginary part to determine the direction dependent comparison information.

12. The system of claim 1, comprising the one or more processors to:
apply a filter to generate combined information to the scale dependent coherence information.

13. The system of claim 1, comprising the one or more processors to:
identify seismic attribute information using a grid; and
generate the one or more images from the seismic attribute information using the grid.

14. The system of claim 1, comprising the one or more processors to:
identify seismic attribute information using a directed graph; and
generate the one or more images from the seismic attribute information using the directed graph.

15. A method of detecting hydrocarbon deposits, comprising:
retrieving, by one or more processors of a computing device, seismic signal traces from at least one memory in communication with the one or more processors;
transforming, by the one or more processors via a wavelet transformation, the seismic signal traces to transformed signals at a first scale and a second scale;
determining, by the one or more processors, scale dependent coherence information comprising a scale dependent covariance matrix for the first scale and the second scale of the transformed signals;
generating, by the one or more processors, from a combination of the scale dependent coherence information for the first scale and the second scale of the transformed signals, one or more images that indicate at least one of stratigraphic information or a presence of a hydrocarbon deposit; and
providing, by the one or more processors, to a display unit in communication with the one or more processors, the one or more images to cause the display unit to display the one or more images.

16. The method of claim 15, comprising:
generating, by the one or more processors, combined information for the first scale and the second scale of the transformed signals based on the scale dependent coherence information; and
generating, by the one or more processors, from the combined information for the first scale and the second scale, the one or more images that indicate the stratigraphic information and the presence of the hydrocarbon deposit.

17. The method of claim 15, comprising:
generating, by the one or more processors, combined information for the first scale and the second scale of the transformed signals based on the scale dependent coherence information;
identifying, by the one or more processors, seismic attribute information based on at least one of an amplitude or a phase of the combined information; and
generating, by the one or more processors, from the seismic attribute information, the one or more images.

18. The method of claim 15, comprising:

generating, by the one or more processors for the first scale and the second scale, a comparison matrix that compares the transformed signals for the first scale and the second scale;

determining, by the one or more processors, direction dependent comparison information based on the comparison matrix;

identifying, by the one or more processors, seismic attribute information based on the direction dependent comparison information; and generating, by the one or more processors, from the seismic attribute information, the one or more images that indicate the stratigraphic information and the presence of the hydrocarbon deposit.

19. The method of claim 15, comprising:

generating, by the one or more processors, combined information and a comparison matrix for the first scale and the second scale;

determining, by the one or more processors, direction dependent comparison information based on the comparison matrix;

identifying, by the one or more processors, seismic attribute information based on at least one of an amplitude or a phase of the combined information and the direction dependent comparison information; and generating, by the one or more processors, from the seismic attribute information, the one or more images that indicate the stratigraphic information and the presence of the hydrocarbon deposit.

20. The method of claim 15, comprising:

generating, by the one or more processors for the first scale and the second scale, a comparison matrix that compares a pair of transformed signals for the first scale and the second scale;

applying, by the one or more processors to the comparison matrix, a filter to modify a directional property of the comparison matrix;

determining, by the one or more processors, direction dependent comparison information based on the directional property of the comparison matrix; and identifying, by the one or more processors, seismic attribute information based on the direction dependent comparison information.

* * * * *